United States Patent
Nakajima et al.

(10) Patent No.: US 9,372,648 B2
(45) Date of Patent: Jun. 21, 2016

(54) IMAGE FORMING DEVICE CAPABLE OF EXCHANGING PRINT DATA WITH ANOTHER IMAGE FORMING DEVICE, AND CONTROL METHOD AND STORAGE MEDIUM THEREFOR

(71) Applicant: CANON KABUSHIKI KAISHA, Tokyo (JP)

(72) Inventors: Junko Nakajima, Yokohama (JP); Satoru Nakajima, Yokohama (JP); Daiji Kirihata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/164,309

(22) Filed: Jan. 27, 2014

(65) Prior Publication Data

US 2014/0211238 A1   Jul. 31, 2014

(30) Foreign Application Priority Data

Jan. 31, 2013   (JP) ................................ 2013-016865

(51) Int. Cl.
*G06F 15/00*   (2006.01)
*G06F 3/12*   (2006.01)

(52) U.S. Cl.
CPC ............ *G06F 3/1238* (2013.01); *G06F 3/1211* (2013.01); *G06F 3/1261* (2013.01); *G06F 3/1267* (2013.01); *G06F 3/1291* (2013.01)

(58) Field of Classification Search
None
See application file for complete search history.

(56) References Cited

U.S. PATENT DOCUMENTS

| | | | |
|---|---|---|---|
| 2006/0139674 A1* | 6/2006 | Oshima | 358/1.13 |
| 2009/0195817 A1* | 8/2009 | Nakajima | 358/1.15 |
| 2011/0292445 A1* | 12/2011 | Kato | 358/1.15 |
| 2012/0019859 A1* | 1/2012 | Natori | 358/1.15 |
| 2012/0320419 A1* | 12/2012 | Ito | G06F 3/1288 358/1.15 |
| 2013/0107322 A1* | 5/2013 | Tonami et al. | 358/1.15 |

FOREIGN PATENT DOCUMENTS

| | | |
|---|---|---|
| JP | 2007-251279 A | 9/2007 |
| JP | 2010-211627 A | 9/2010 |

* cited by examiner

*Primary Examiner* — Helen Q Zong
(74) *Attorney, Agent, or Firm* — Rossi, Kimms & McDowell LLP

(57) ABSTRACT

An image forming device capable of acquiring to-be-printed data from any of external image forming devices, without making inquiries about the presence or absence of the to-be-printed data to all the external image forming devices. An image forming apparatus receives, from another image forming apparatus that has received print data, bibliographic information containing identification information that identifies the another image forming apparatus, and registers the received bibliographic information. When receiving a bibliographic information acquisition request, the image forming apparatus transmits bibliographic information, among pieces of bibliographic information registered in the image forming apparatus, to the image forming apparatus that has transmitted the bibliographic information acquisition request.

8 Claims, 22 Drawing Sheets

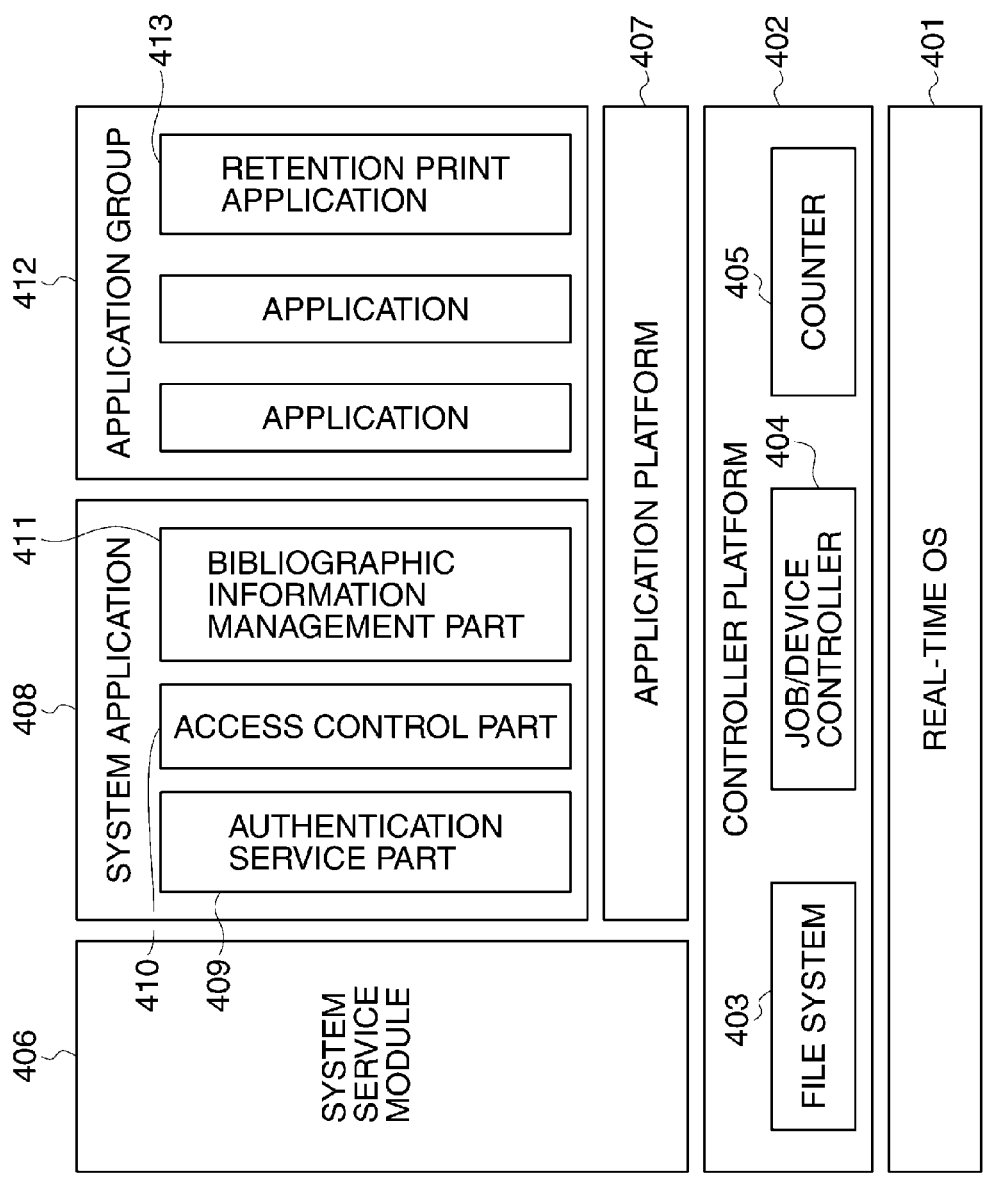

| USER NAME | RECEPTION TIME | STORAGE LOCATION | | NAME | PRINT SETTINGS | | | | PRINT COMPLE-TION FLAG |
|---|---|---|---|---|---|---|---|---|---|
| | | IP ADDRESS | PATH | | COLOR MODE | SHEET SIZE | NUMBER OF SETS | FINISHING | |
| Yamada | 2012.05.21 10:21:12 | 192.168.1.1 | /printdata/0015/xxx | AAA.ppt | FULL COLOR | A3 | 100 | STAPLING (UPPER LEFT) | 1 |
| | 2012.05.30 15:08:32 | 192.168.3.1 | /printdata/0691/yyy | BBB.pdf | FULL COLOR | A4 | 1 | DOUBLE-SIDED ON | 0 |
| | 2012.06.02 13:44:21 | 192.168.3.8 | /printdata/8125/zzz | CCC.doc | GRAY SCALE | A4 2in1 | 10 | PUNCHING (LEFT) | 0 |
| Suzuki | 2012.05.28 09:10:05 | 192.168.3.8 | /printdata/0023/sss | DDD.txt | MONO-CHROME | B5 | 1 | — | 0 |
| | 2012.06.01 21:53:02 | 192.168.1.1 | /printdata/2108/www | EEE.jpg | FULL COLOR | A4 | 1 | — | 1 |

```
REQUEST TYPE            : BIBLIOGRAPHIC INFORMATION
   USER INFORMATION       ACQUISITION
      USER NAME         : Yamada
      DOMAIN NAME       : Localhost
   NUMBER OF ACQUISITIONS : 100
   REQUEST SOURCE INFORMATION
      IP ADDRESS        : 192.168.1.5
      STORAGE UNIT      : HDD
      COLOR/MONOCHROME  : MONOCHROME
      SUPPORT SHEET     : A4
      FINISHER          : STAPLING
```

FIG. 15

| USER NAME | IP ADDRESS | NUMBER OF TIMES OF ACQUISITION | LAST ACQUISITION DATE AND TIME |
|---|---|---|---|
| Yamada | 192.168.1.1 | 10 | 2012.05.21 10:21:12 |
| Yamada | 192.168.3.1 | 5 | 2012.05.30 15:08:32 |
| Suzuki | 192.168.3.8 | 2 | 2012.05.28 09:10:05 |

IMAGE FORMING DEVICE CAPABLE OF EXCHANGING PRINT DATA WITH ANOTHER IMAGE FORMING DEVICE, AND CONTROL METHOD AND STORAGE MEDIUM THEREFOR

BACKGROUND OF THE INVENTION

1. Field of the Invention

The present invention relates to an image forming device capable of transmitting and receiving print data to and from another image forming device, a control method therefor, and a storage medium storing a program for executing the control method.

2. Description of the Related Art

Conventionally, most of image forming devices (also called image forming apparatuses) are configured to immediately print out print data that is received from an information processing apparatus such as a personal computer. Thus, if, for example, a print product is left unpicked, there is a fear that information is leaked to a third party.

To obviate this, there has been proposed an image forming apparatus that performs retention printing where received print data is not printed immediately, but printed in response to a print instruction request input by a user (see, for example, Japanese Laid-open Patent Publication No. 2007-251279).

There has also been known a retention printing system that has a server in which are registered pieces of bibliographic information each identify a corresponding one of print data respectively received by image forming apparatuses (see, for example, Japanese Laid-open Patent Publication No. 2010-211627). With this printing system, if an image forming apparatus that has received print data cannot print the print data (also referred to as the to-be-printed data) by itself, another image forming apparatus (also referred to as the external image forming apparatus) identifies and prints the to-be-printed data corresponding to a print instruction request input by a user, while referring to bibliographic information registered in the server.

However, this retention printing system requires the server for registering pieces of bibliographic information, and hence requires costs for introduction, maintenance, and management of the server.

An image forming apparatus has also been known that can realize retention printing without using a server. In this printing system, if print data cannot be printed by an image forming apparatus that has received the print data, the image forming apparatus transmits bibliographic information that identifies the to-be-printed data to external image forming apparatuses. The to-be-printed data is printed by an external image forming apparatus stored with the to-be-printed data identified by the bibliographic information, among the external image forming apparatuses to which the bibliographic information is transmitted.

With the above-described printing system, however, the image forming apparatus that cannot print the to-be-printed data by itself is required to transmit the bibliographic information to all the external image forming apparatuses to make inquiries about the presence or absence of the to-be-printed data. This results in unnecessary connections to external image forming apparatuses in which the to-be-printed data is not stored. In addition, if some of the unnecessarily connected external image forming apparatuses are in a power-saving mode, such external image forming apparatuses are returned from the power-saving mode to receive the bibliographic information, resulting in wasteful power consumption.

SUMMARY OF THE INVENTION

The present invention provides an image forming device capable of acquiring to-be-printed data from any of external image forming devices, without making inquiries about the presence or absence of the to-be-printed data to all the external image forming devices, and provides a control method for the image forming device and a storage medium storing a program for executing the control method.

According to one aspect of this invention, there is provided an image forming device comprising a reception unit configured to receive, from a first device of other image forming devices that has stored print data, print settings in which at least a print setting for printing the print data is included and a user ID of a user who instructed the first device to print an image, a registration unit configured to register the print settings, the user ID, and a device ID of the first device, and a transmission unit configured, in a case where a request is issued from a second device of the other image forming devices to which a user has logged-in, to transmit the print settings and the device ID to the second device, based on a determination that a user ID of the user who has logged-in to the second device corresponds to the user ID registered in the registration unit.

With this invention, it is possible to acquire to-be-printed data from any of external image forming devices, without making inquiries about the presence or absence of the to-be-printed data to all the external image forming devices.

Further features of the present invention will become apparent from the following description of exemplary embodiments with reference to the attached drawings.

BRIEF DESCRIPTION OF THE DRAWINGS

FIG. 4 is a block diagram showing a software structure of the image forming apparatus shown in FIG. 3;

FIG. 5 is a view showing an example of a bibliographic information management table that is referred to by a bibliographic information management part of the image forming apparatus shown in FIG. 4 for management of bibliographic information on a per user basis;

FIG. 10 is a view showing a bibliographic information acquisition request transmitted in step S806 of the printing overall process shown in FIG. 9;

FIG. 15 is a view showing an example of use history information stored in an HDD of an image forming apparatus or of a printer, each of which is the printing apparatus;

DESCRIPTION OF THE EMBODIMENTS

The present invention will now be described in detail below with reference to the drawings showing a preferred embodiment thereof.

Figure 1:
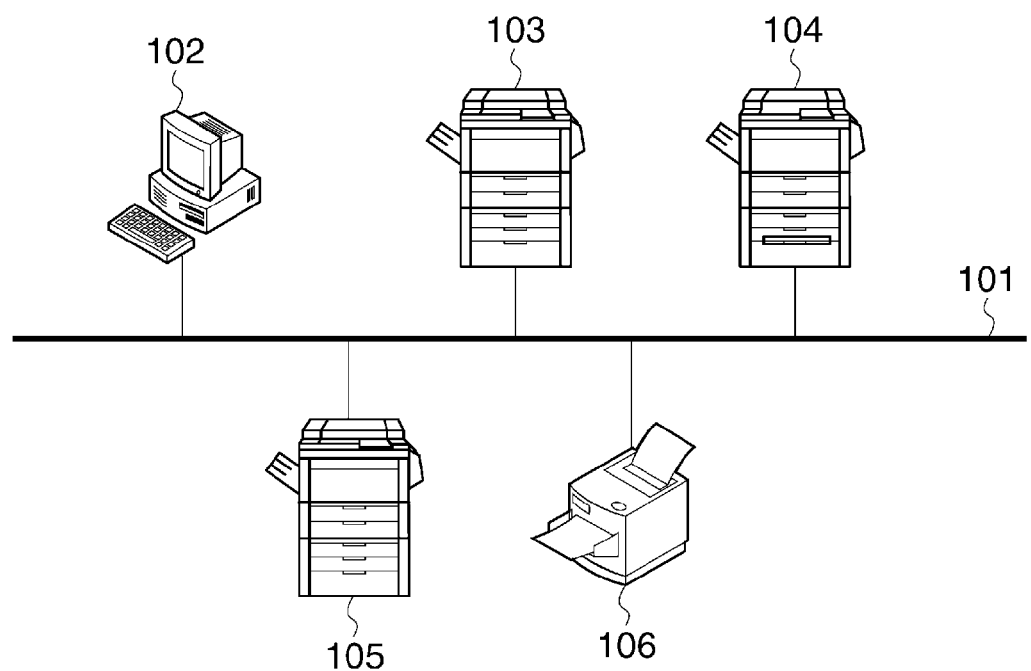
FIG. 1 is a view schematically showing the construction of an image forming system according to one embodiment of this invention.

FIG. 1 schematically shows the construction of an image forming system 100 according to one embodiment of this invention.

As shown in FIG. 1, the image forming system 100 includes image forming apparatuses (image forming devices) 103-106 and a personal computer 102 as an information processing apparatus, which are connected to a network 101. The image forming apparatuses 103-105 are each configured by e.g. an MFP (multi-function peripheral), and the image forming apparatus 106 is configured by e.g. a printer.

In this embodiment, the image forming apparatus 103 serves as a print data receiver that immediately prints print data received from the personal computer 102 or that stores the received print data for subsequent printing.

The image forming apparatus 104 serves as a bibliographic server (also referred to as the image forming apparatus with management function) that manages pieces of bibliographic information based on which pieces of print data stored in other image forming apparatuses are identified.

The image forming apparatus 105 and the printer 106 each serve as a printing apparatus that acquires bibliographic information identifying to-be-printed data from the image forming apparatus 104 (bibliographic server), receives the to-be-printed data from the image forming apparatus 103 (print data receiver) according to the acquired bibliographic information, and prints the received data.

In this embodiment, page description language (PDL) data is used as print data. The image forming apparatus 103 analyzes the PDL data, performs RIP processing on the PDL data, and prints the RIP-processed PDL data. It should be noted that print data is not limited to the PDL data, but may be data of any format that can be analyzed and printed by the image forming apparatus 103, such as TIFF image data or application document data.

In this embodiment, each of the print data receiver, the bibliographic server, and the printing apparatus has a function of transmitting to-be-printed data in response to a request from another image forming apparatus (external image forming apparatus) and a function of acquiring to-be-printed data from another image forming apparatus and printing the acquired data.

The image forming system 100 having the above-described construction is a mere example. This invention can be applied to a system of any construction having at least one each of the information processing apparatus, print data receiver, bibliographic server, and printing apparatus.

Figure 2:
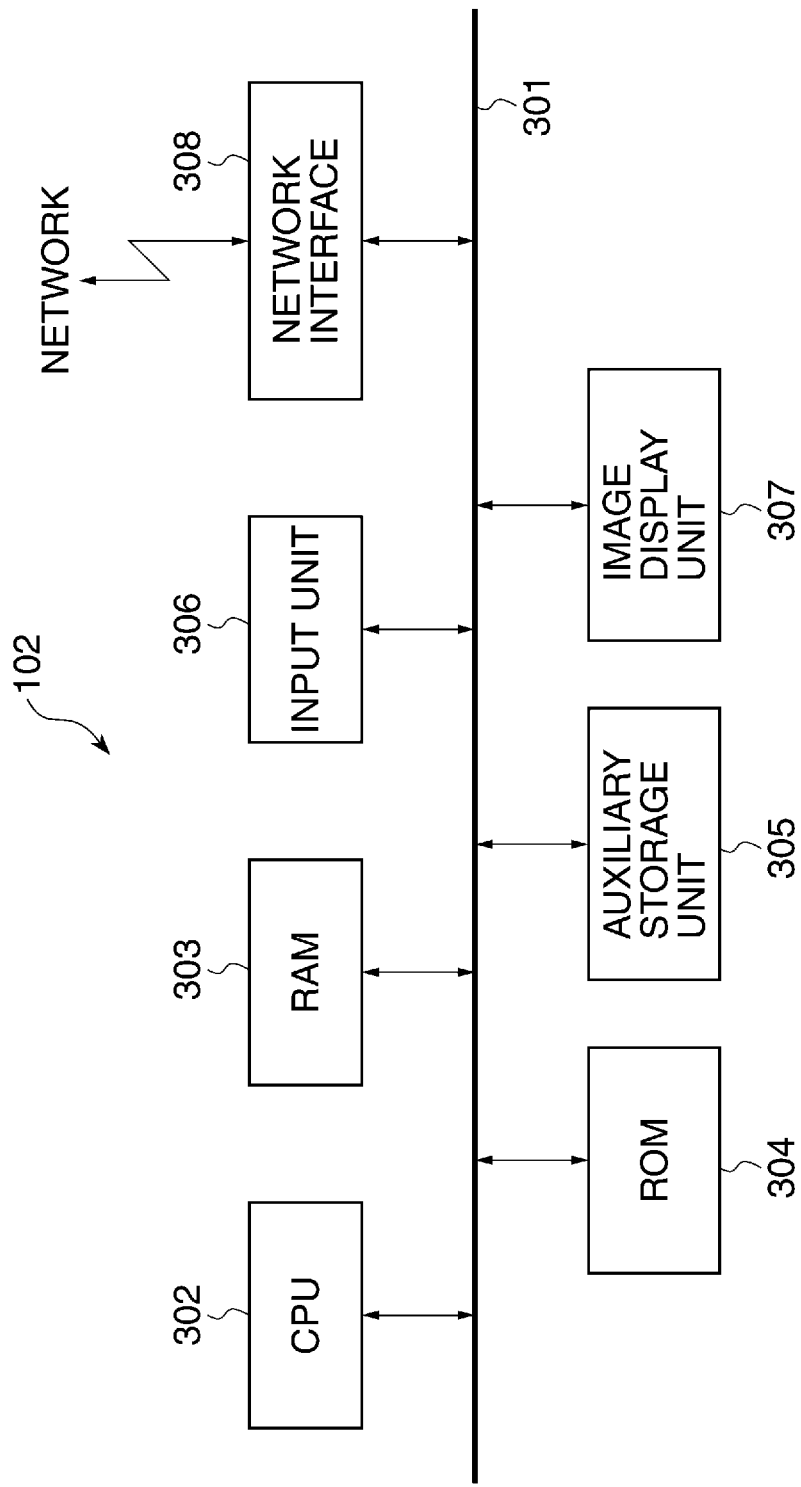
FIG. 2 is a block diagram schematically showing the construction of a personal computer of the image forming system.

FIG. 2 schematically shows the construction of the personal computer 102.

As shown in FIG. 2, the personal computer 102 includes a CPU 302 that controls the entire personal computer 102, a RAM 303 for use as e.g. a work area, and a ROM 304. The personal computer 102 also includes an auxiliary storage unit 305 for storing control program, etc., an input unit 306 used by the user for input operation to the personal computer 102, an image display unit 307 for displaying information, and a network interface 308 for inputting and outputting various information from and to external devices through a network. These parts 302-308 of the personal computer 102 are connected to a main bus 301.

Figure 3:
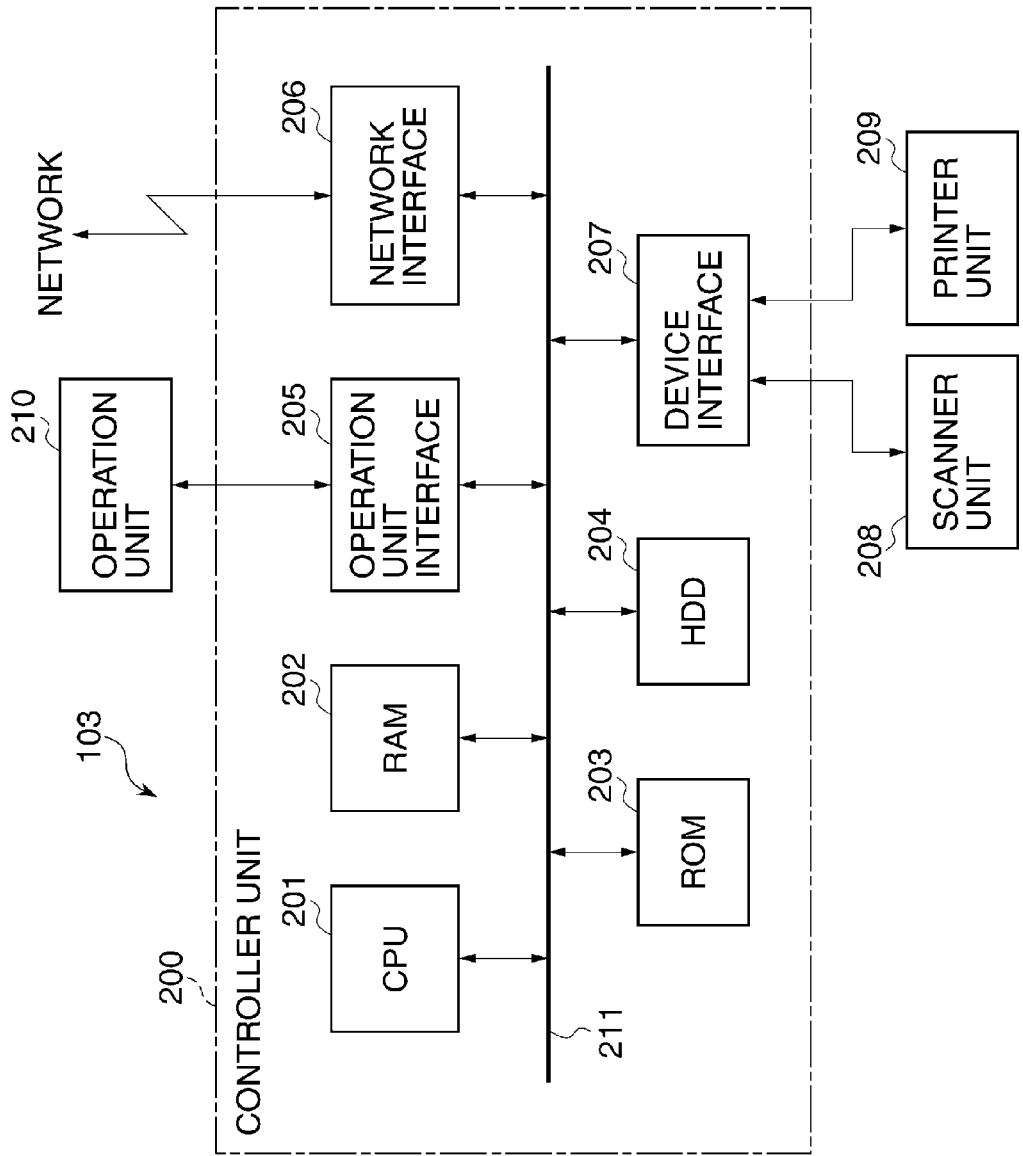
FIG. 3 is a block diagram schematically showing the construction of one of image forming apparatuses of the image forming system.

FIG. 3 schematically shows the construction of the image forming apparatus 103.

It should be noted that each of the image forming apparatuses 104-106 is the same in construction as the image forming apparatus 103, and a description will be omitted. It should be noted that the image forming apparatus (printer) 106 is not provided with the scanner unit 208.

As shown in FIG. 3, the image forming apparatus 103 includes a controller unit 200, a scanner unit 208, a printer unit 209, and an operation unit 210 having a touch panel.

The controller unit 200 includes a CPU 201, a RAM 202, a ROM 203, a HDD 204, an operation unit interface 205, a network interface 206, and a device interface 207, which are connected to a system bus 211.

The CPU 201 centrally controls respective parts of the controller unit 200, thereby controlling the entire image forming apparatus 103.

The RAM 202 is stored with programs, such as operating system, system software, and application software, and also stored with data. The programs stored in the RAM 202 are executed by the CPU 201. The CPU 201 processes data, such as image data, stored in the RAM 202, ROM 203, and HDD 204.

The ROM 203 is stored with boot program, system program, and application program, and also stored with information such as fonts required for image formation.

The HDD 204 is stored with operating system (hereinafter, referred to the OS), system software, application software, image data, setting data, and the like. Instead of using the HDD 204, an SSD (solid state drive) can be used. Some small-sized image forming apparatus does not have the HDD 204. In that case, system software, application software, etc. are stored in the ROM 203.

The operation unit interface 205 is an interface between the operation unit 210 and the controller unit 200. The operation unit interface 205 outputs image data to the operation unit 210, and outputs to the CPU 201 information input by the user through the operation unit 210.

The network interface 206 inputs and outputs image data and control information for the image forming apparatus from and to external devices via the network. The device interface 207 is an interface between the controller unit 200 and the scanner unit 208 which is an image input/output device and between the controller unit 200 and the printer unit 209.

Image data input from the scanner unit 208 via the device interface 207 is stored into the RAM 202 or into the HDD 204. The stored image data is subjected, where required, to image processing by an application program stored in the RAM 202. Image data is output to the printer unit 209 via the device interface 207.

In addition to the above-described construction, the image forming apparatus 103 can have a construction for achieving a fax function, an interface with a memory card, a USB interface, etc.

FIG. 4 shows a software structure of the image forming apparatus 103. It should be noted that the image forming apparatuses 104-106 each have the same software structure as that of the image forming apparatus 103, and a description thereof will be omitted.

The software structure shown in FIG. 4 is installed on the controller unit 200 and executed by the CPU 201. This software structure includes a real-time OS 401, a controller platform 402, a system service module 406, an application platform 407, a system application 408, and an application group 412.

The real-time OS 401 provides software running thereon with various resource management services and frameworks optimized for control of a built-in system. Various resource management services and frameworks provided by the real-time OS 401 include multitask management of substantially parallel-operation of plural processes, which is achieved by managing execution contexts of processes performed by the CPU 201, and inter-task communication for implementing synchronization and data exchange between tasks. The real-time OS 401 also provides memory management, interrupt management, various device drivers, and protocol stacks implementing various protocol processes for a local interface, network, communication, and the like.

The controller platform 402 includes a file system 403, a job/device controller 404, and a counter 405.

The file system 403 is a data structure constructed on a storage device such as the HDD 204 or the RAM 202 and used, for example, to spool jobs processed by the controller unit 200 and save various data. The job/device controller 404 controls hardware of the image forming apparatus 103, and controls a job that uses basic functions such as printing, scanning, communication, and image conversion, which are provided mainly by hardware. The counter 405 is used for management of expiration date of each application, the number of times of printing, the number of times of scanning, etc.

The system service module 406 is a module used to monitor the status of operation of the image forming apparatus 103 and used to download software and license from a software delivery server via the network.

The application platform 407 is a middleware that enables the system application 408 and the application group 412 to utilize the real-time OS 401 and the controller platform 402.

The system application 408 includes an authentication service part 409, an access control part 410, and a bibliographic information management part 411.

The authentication service part 409 checks the user name and password input via the operation unit 210 or via the network against a user database stored in the HDD 204, to thereby authenticate the user. For the user authentication, an external authentication server such as Active Directory can be used instead of using the user database stored in the HDD 204.

The access control part 410 is a security module used to permit or prohibit access to a job or to various resources according to user authority or according to security settings set on data.

The bibliographic information management part 411, which is an indispensable constituent for the bibliographic server, is a module that manages, on a per user basis, bibliographic information of print data stored in each of the image forming apparatuses connected to the network. More specifically, the bibliographic information management part 411 manages a bibliographic information management table (described later) stored in the HDD 204.

The application group 412 includes various applications installed on the image forming apparatus 103 for providing various functions of the image forming apparatus 103. For example, the application group 412 includes a retention print application 413 that displays a list of retained print data, determines the necessity/unnecessity of retention of received print data, performs a printing process, and so on.

FIG. 5 shows an example of the bibliographic information management table 500 that is referred to by the bibliographic information management part 411 of the image forming apparatus 103 for management of bibliographic information on a per user basis.

The bibliographic information management table 500 has records respectively corresponding to users who are permitted to access the image forming apparatus 103. In the illustrated example, the management table 500 has five records.

Each record has a "user name" field and a "bibliographic information" field. The "user name" field of each record is stored with a user name, which is user information. It should be noted that in the illustrated example, the "user name" fields of the first to third records of the management table 500 are collectively shown as one field. This also applies to the "user name" fields of the fourth and fifth records. The "bibliographic information" field of each record has fields of reception time, storage location, print settings, and print completion flag.

The "reception time" field is stored with information that indicates reception time of print data. The "storage location" field is stored with information that indicates an IP address of an image forming apparatus in which print data is stored, a path, and a name of print data. The "print settings" filed is stored with information that indicates settings about printing (such as color mode, sheet size, number of sets, and finishing), which are set by a printer driver of the personal computer 102. The "print completion flag" is stored with a flag value that indicates whether print data has been printed. More specifically, the flag value is set to 1, if the print data has been printed, and set to 0, if the print data has not been printed.

In the illustrated example, the first record in the bibliographic information management table 500 corresponds to a user whose user name is Yamada, and indicates that print data whose name is "AAA.ppt" was received on May 21, 2012 10:21:12 by the image forming apparatus whose IP address is 192.168.1.1, was stored in a path of "/printdata/0015/xxx/," and was printed 100 sets in A4 and full color with staple finishing.

Next, a description will be given of a process for print data transmission from the personal computer 102 to the image forming apparatus 103.

The user causes an application running on the personal computer 102 to start a printer driver, and performs print settings on a printer driver screen (not shown). Then, the user selects as print data receiver the image forming apparatus 103, and gives an instruction for printing. At that time, the user can explicitly give an instruction for retention printing.

Figure 6:
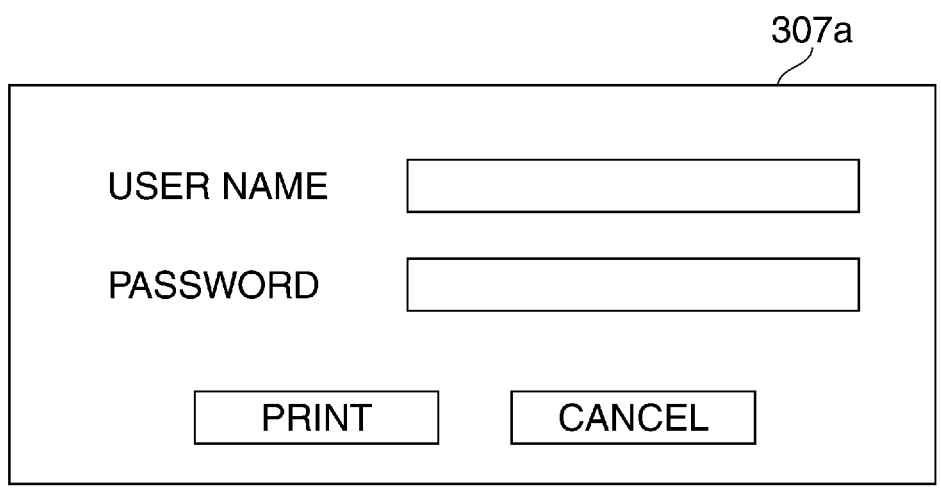
FIG. 6 is a view showing a user authentication screen displayed on an image display unit of the personal computer.

When receiving the print instruction, the printer driver displays a user authentication screen. FIG. 6 shows an authentication screen 307a displayed on the image display unit 307 of the personal computer 102. The user inputs user authentication information (user name and password) on the authentication screen 307a, and then presses a print button to thereby instruct printing.

The printer driver transmits to the image forming apparatus 103 a request for authentication together with the user name and the password. The user name is user information that indicates a user by whom print data has been transmitted from the personal computer 102. The authentication service part 409 of the image forming apparatus 103 checks the user name and the password received from the printer driver against the user database stored in the HDD 204, and transmits a result of user authentication to the personal computer 102.

The printer driver receives the user authentication result. If the authentication has failed, the printer driver makes an error exit from the printing process. On the other hand, if the authentication has succeeded, the printer driver converts application data created by the user into PDL data according to print settings, creates print data that contains the PDL data and user information, and transmits the created print data to the image forming apparatus 103.

It should be noted that if the personal computer 102 belongs to the same domain as the image forming apparatus 103 and the result of user authentication by the personal computer 102 is guaranteed, the user authentication can be performed by the personal computer 102 without requesting the image forming apparatus 103 to perform the authentication. In the case of making the user authentication by the personal computer 102, the input of authentication information by the user on the authentication screen 307a can be omitted, and instead user information registered in advance in the printer driver can be used.

Figure 7:
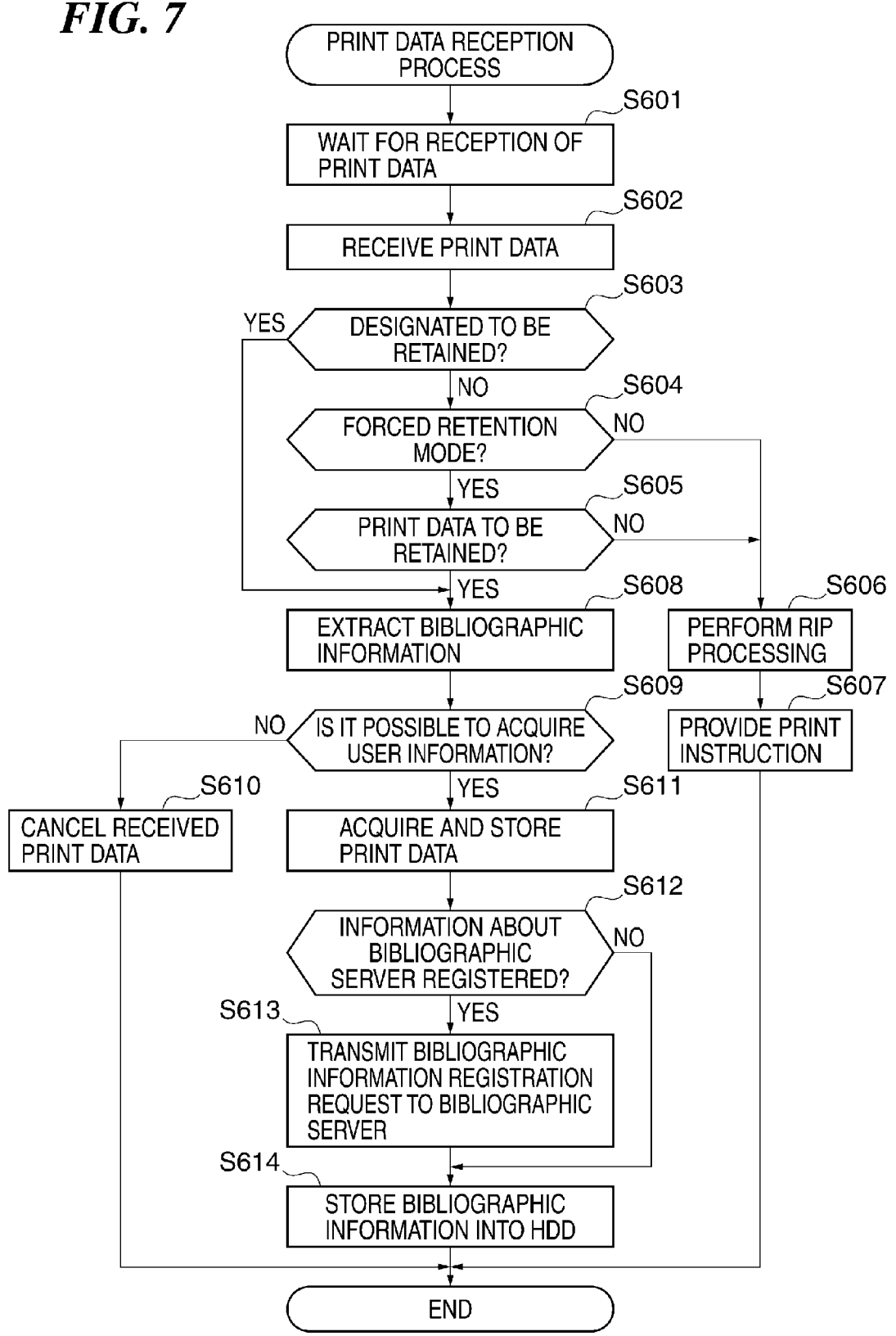
FIG. 7 is a flowchart showing procedures of a print data reception process executed by an image forming apparatus, which is a print data receiver.

FIG. 7 shows in flowchart the procedures of a print data reception process executed by the software modules shown in FIG. 4 and running on the CPU 201 of the image forming apparatus 103, which is the print data receiver.

In the print data reception process of FIG. 7, the job/device controller 404 waits for reception of print data (step S601). When receiving in step S602 print data from the personal computer 102 via the network interface 206, the job/device controller 404 transmits the print data to the retention print application 413. Step S602 corresponds to a reception unit of this invention that receives print data.

Next, the retention print application 413 determines whether the print data received from the job/device controller 404 is designated to be retained (step S603). If the print data is designated to be retained (YES to step S603), the flow proceeds to step S608. On the other hand, if the print data is not designated to be retained (NO to step S603), the retention print application 413 determines whether the image forming apparatus 103 is in a forced retention mode (step S604).

If the image forming apparatus 103 is not in the forced retention mode (No to step S604), the retention print application 413 performs RIP processing on PDL data contained in the print data according to print settings (step S606), and provides a print instruction to the printer unit 209 via the device interface 207 (step S607), whereupon the present process is completed. In response to the print instruction, the printer unit 209 prints the print data. On the other hand, if the image forming apparatus 103 is in the forced retention mode (YES to step S604), the retention print application 413 determines whether the print data received from the job/device controller 404 is to be retained (step S605).

If the print data is not to be retained (NO to step S605), the flow proceeds to step S606. On the other hand, if the print data is to be retained (YES to step S605), the retention print application 413 extracts bibliographic information from the print data received from the job/device controller 404 (step S608).

Next, the retention print application 413 determines whether user information can be acquired from the print data (step S609). If user information cannot be acquired from the print data (NO to step S609), the retention print application 413 cancels the print data received in step S602 (step S610), and completes the present process. On the other hand, if user information can be acquired from the print data (YES to step S609), the retention print application 413 acquires user information from the print data, and causes the file system 403 to store the print data into the HDD 204 (step S611). Step S611 (HDD 204) corresponds to a storage unit of this invention that stores print data received by the reception unit.

Next, the retention print application 413 determines whether information about the image forming apparatus 104 (bibliographic server) has been registered in the image forming apparatus 103 (step S612). If the information about the image forming apparatus 104 has not been registered (NO to step S612), the flow proceeds to step S614. On the other hand, if the information about the image forming apparatus 104 has been registered (YES to step S612), the retention print application 413 transmits an information registration request to the image forming apparatus 104 (step S613).

Step S613 corresponds to a registration unit of this invention that transmits bibliographic information including identification information (IP address in this embodiment) that identifies an image forming apparatus to an image forming apparatus with management function to thereby register the bibliographic information into the image forming apparatus with management function.

Then, the retention print application 413 causes the file system 403 to store bibliographic information into the HDD 204 (step S614), whereupon the present process is completed.

Figure 8:
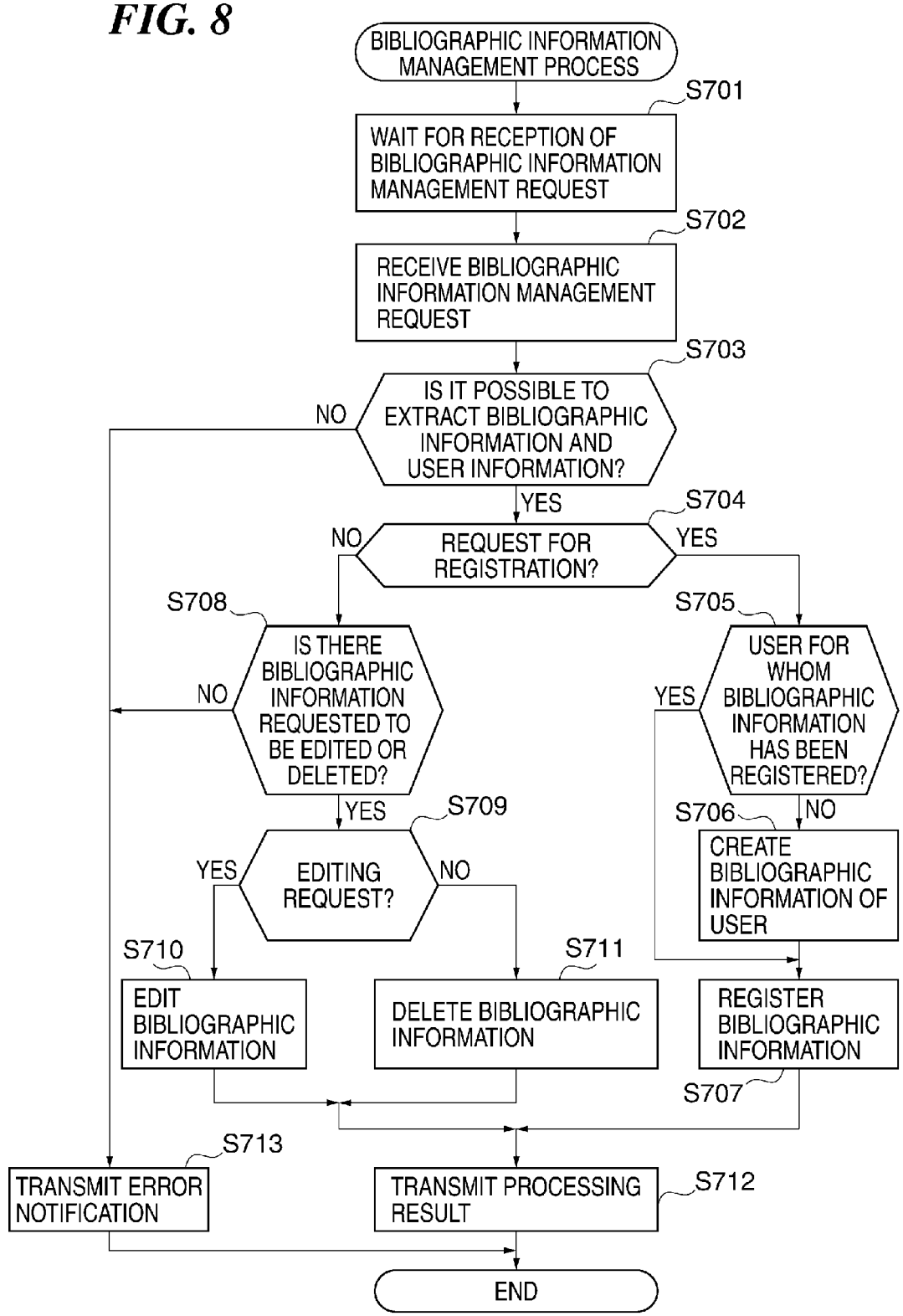
FIG. 8 is a flowchart showing procedures of a bibliographic information management process executed by an image forming apparatus, which is a bibliographic server.

FIG. 8 shows in flowchart the procedures of a bibliographic information management process executed by software modules running on the CPU 201 of the image forming apparatus 104, which is the bibliographic server.

In the bibliographic information management process of FIG. 8, the bibliographic information management part 411 waits for reception of a bibliographic information management request (step S701), receives a bibliographic information management request from the request source image forming apparatus via the network interface 206 (step S702), and determines whether bibliographic information and user information can be extracted from the received bibliographic information management request (step S703).

If bibliographic information and user information cannot be extracted (NO to step S703), the bibliographic information management part 411 transmits an error notification to the request source image forming apparatus (step S713), and completes the present process. On the other hand, if bibliographic information and user information can be extracted (YES to step S703), the bibliographic information management part 411 determines whether the bibliographic information management request received in step S702 is a request for registration (step S704).

If the bibliographic information management request is a registration request (YES to step S704), the bibliographic information management part 411 extracts bibliographic information and user information from the management request, and determines whether a "user name" field in which the extracted user information (user name) is to be stored has been created in the bibliographic information management table 500, thereby determining whether the user indicated by the user information extracted from the management request is a user for whom bibliographic information has been registered in the bibliographic information management table 500 (step S705).

If the user indicated by the user information is a user for whom bibliographic information has been registered (YES to step S705), the flow proceeds to step S707. On the other hand, if the user indicated by the user information is not a user for whom bibliographic information has been registered (NO to step S705), the bibliographic information management part 411 creates a "user name" field in the bibliographic information management table 500 into which the user information (user name) extracted in step S705 is to be stored, thereby creating bibliographic information of the user indicated by the user information (step S706).

In step S707, the bibliographic information management part 411 registers the bibliographic information of the user into the bibliographic information management table 500, whereupon the flow proceeds to step S711. Step S707 corresponds to a registration unit of this invention that is configured to receive, from another image forming apparatus that has received print data, bibliographic information including identification information that identifies the other image forming apparatus and register the received bibliographic information.

If the bibliographic information management request is not a registration request, the management request is a request for editing or deleting bibliographic information. Accordingly, if the bibliographic information management request is not a registration request (NO to step S704), the bibliographic information management part 411 determines whether or not there is bibliographic information that is requested to be edited or deleted (step S708). If there is no such bibliographic information (NO to step S708), the flow proceeds to step S713, which is already described above.

On the other hand, if there is bibliographic information requested to be edited or deleted (YES to step S708), the bibliographic information management part 411 determines whether the bibliographic information management request is an editing request (step S709). If the management request is an editing request (YES to step S709), the management part 411 edits bibliographic information that is requested to be edited (step S710), and proceeds to step S712. On the other hand, if the management request is not an editing request but a deleting request (NO to step S709), the management part 411 deletes bibliographic information that is requested to be deleted (step S711), and proceeds to step S712.

In step S712, the bibliographic information management part 411 transmits a processing result to the request source image forming apparatus, and completes the present process.

Figure 9:
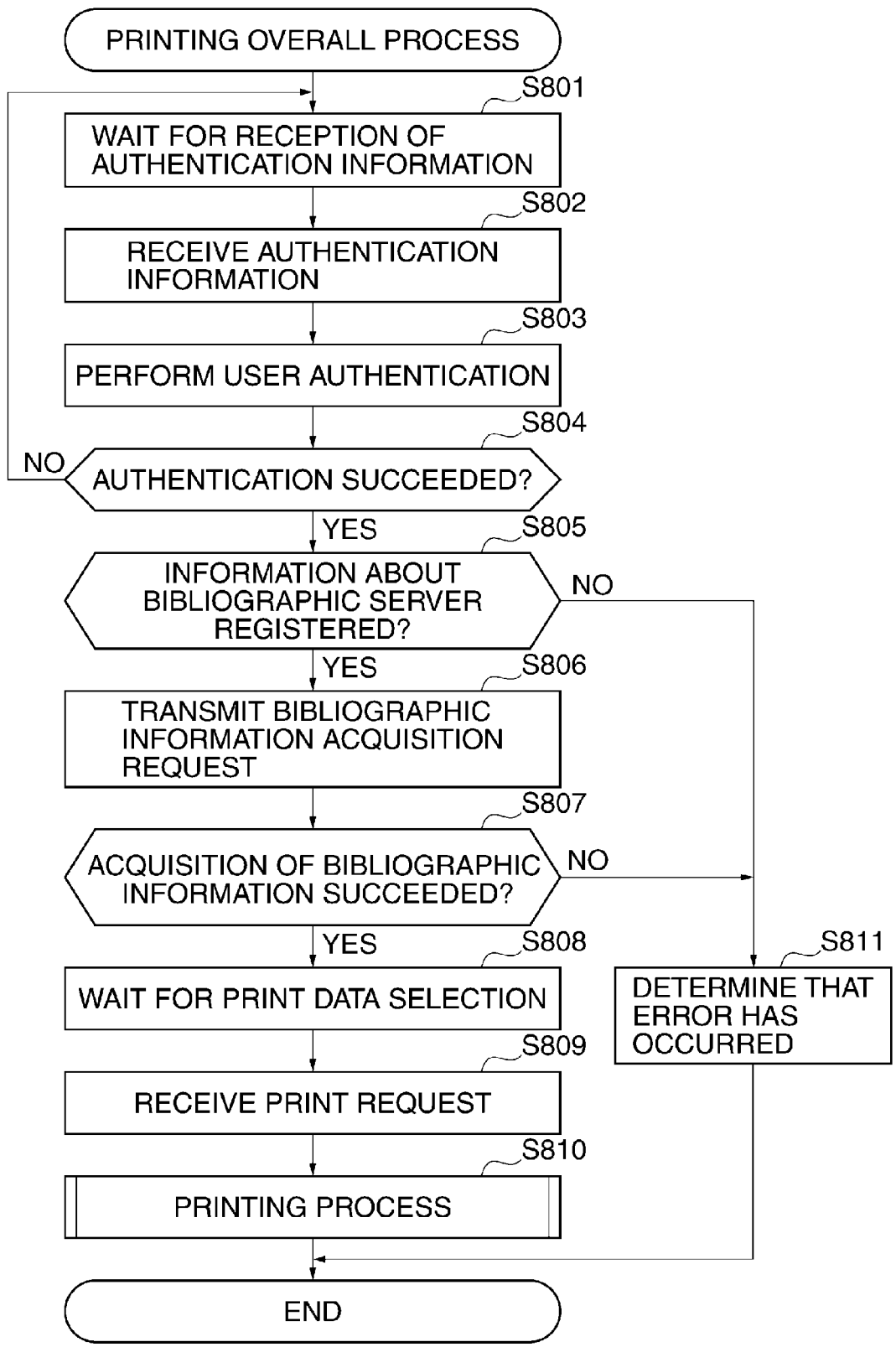
FIG. 9 is a flowchart showing procedures of a printing overall process executed by an image forming apparatus, which is a printing apparatus.

FIG. 9 shows in flowchart the procedures of a printing overall process executed by software modules running on the CPU 201 of the image forming apparatus 105, which is the printing apparatus. It should be noted that the printer 106 serving as a printing apparatus is also capable of executing the printing overall process. In that case, the term "image forming apparatus 105" in the following description shall be replaced with "printer 106."

At start of the printing overall process, the authentication service part 409 waits for reception of user authentication information (step S801). User authentication information is input by the user on an authentication screen displayed on the operation unit 210 of the image forming apparatus 105, and is received by and transmitted from the operation unit 210. The authentication service part 409 receives the authentication information from the operation unit 210 via the operation unit interface 205 (step S802), performs user authentication based on the received authentication information (step S803), and determines whether the user authentication has succeeded (step S804).

If the user authentication has not succeeded (NO to step S804), the flow returns to step S801. On the other hand, if the user authentication has succeeded (YES to step S804), the authentication service part 409 notifies the retention print application 413 of the result of the authentication.

The retention print application 413 determines whether information about the image forming apparatus 104, which is the bibliographic server, has been registered in the image forming apparatus 105 (step S805). If information about the image forming apparatus 104 has not been registered (NO to step S805), the retention print application 413 determines that an error has occurred (step S811), and completes the present process.

On the other hand, if information about the image forming apparatus 104 has been registered (YES to step S805), the retention print application 413 transmits a bibliographic information acquisition request (see FIG. 10) to the image forming apparatus 104 (step S806). Step S806 corresponds to a bibliographic information acquisition unit of this invention that transmits a bibliographic information acquisition request to the image forming apparatus with management function and acquires bibliographic information corresponding to the bibliographic information acquisition request from among pieces of bibliographic information registered in the image forming apparatus with management function.

Next, the retention print application 413 determines whether acquisition of bibliographic information has succeeded (step S807). If acquisition of bibliographic information has not succeeded (NO to step S807), the flow proceeds to step S811, which is already described above. On the other hand, if acquisition of bibliographic information has succeeded (YES to step S807), the retention print application 413 causes the operation unit 210 to display a list of print data, and waits for print data selection from the list by the user (step S808).

When print data is selected by the user from the list of print data, the operation unit 210 accepts the print data selection and transmits a request for printing the selected print data to the retention print application 413 via the operation unit interface 205. The retention print application 413 receives the print request (step S809), performs a printing process according to procedures described later with reference to in FIG. 11 (step S810), and completes the present process.

FIG. 10 shows the bibliographic information acquisition request 1400 transmitted from the retention print application 413 in step S806 of the printing overall process of FIG. 9.

As shown in FIG. 10, the bibliographic information acquisition request 1400 includes items of request type, user information, number of acquisitions, and request source information. The "user information" item has sub-items of user name and domain name. The "request source information" item has sub-items of IP address, storage unit, color/monochrome, support sheet, and finisher that are device construction information of the image forming apparatus 105 or the printer 106, each of which is the printing apparatus. In the bibliographic information acquisition request 1400 of the illustrated example, a user name "Yamada" and a domain name "localhost" are indicated in the "user information" item, and IP address "192.168.1.5" and the like are indicated in the "request source information" item.

Figure 11:
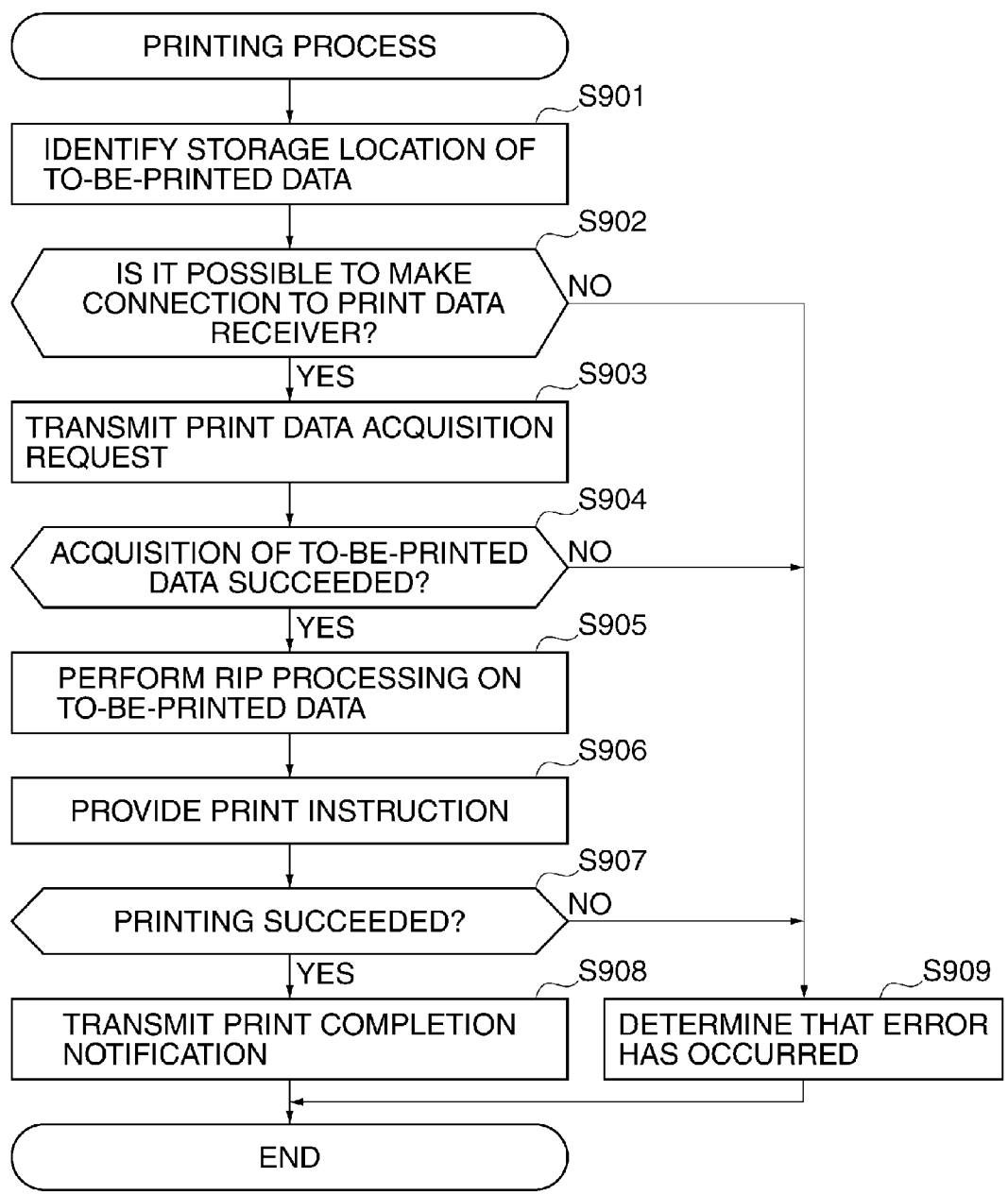
FIG. 11 is a flowchart showing procedures of a printing process executed in step S810 of the printing overall process.

FIG. 11 shows in flowchart the procedures of the printing process executed in step S810 of the printing overall process of FIG. 9.

At start of the printing process of FIG. 11, the retention print application 413 identifies a storage location of to-be-printed data based on bibliographic information of print data contained in the print request received in step S809 of FIG. 9 (step S901), and determines whether connection to the image forming apparatus 103, which is the print data receiver that has received the to-be-printed data stored in the storage location identified in step S901, can be made via the network interface 206 (step S902).

If connection to the image forming apparatus 103 cannot be made (NO to step S902), the retention print application 413 determines that an error has occurred (step S909), and completes the present process. On the other hand, if connection to the image forming apparatus 103 can be made (YES to step S902), the retention print application 413 transmits a print data acquisition request to the image forming apparatus 103 via the network interface 206 (step S903). Steps S901 and S903 correspond to a print data acquisition unit of this invention that is configured to identify an image forming apparatus stored with to-be-printed data based on identification information contained in acquired bibliographic information, and configured to acquire the to-be-printed data from the identified image forming apparatus.

Next, the retention print application 413 determines whether acquisition of the to-be-printed data from the image forming apparatus 103 has succeeded (step S904). If the acquisition of the to-be-printed data has not succeeded (NO to step S904), the flow proceeds to step S909 which is described above. On the other hand, if the acquisition of the to-be-printed data has succeeded (YES to step S904), the retention print application 413 transmits the to-be-printed data to the job/device controller 404.

The job/device controller 404 performs RIP processing on PDL data contained in the to-be-printed data according to print settings (step S905), and provides a print instruction to the printer unit 209 via the device interface 207 (step S906). In response to the print instruction, the printer unit 209 prints the to-be-printed data. Step S906 corresponds to a printing unit of this invention that is configured to print the to-be-printed data that has been acquired.

Next, the retention print application 413 determines whether printing of the to-be-printed data has succeeded (step S907). If the printing has not succeeded (NO to step S907), the flow proceeds to step S909 which is already described. On the other hand, if the printing has succeeded (YES to step S907), the retention print application 413 transmits a print completion notification to the image forming apparatus 103 via the network interface 206 (step S908), and completes the present process.

Figure 12:
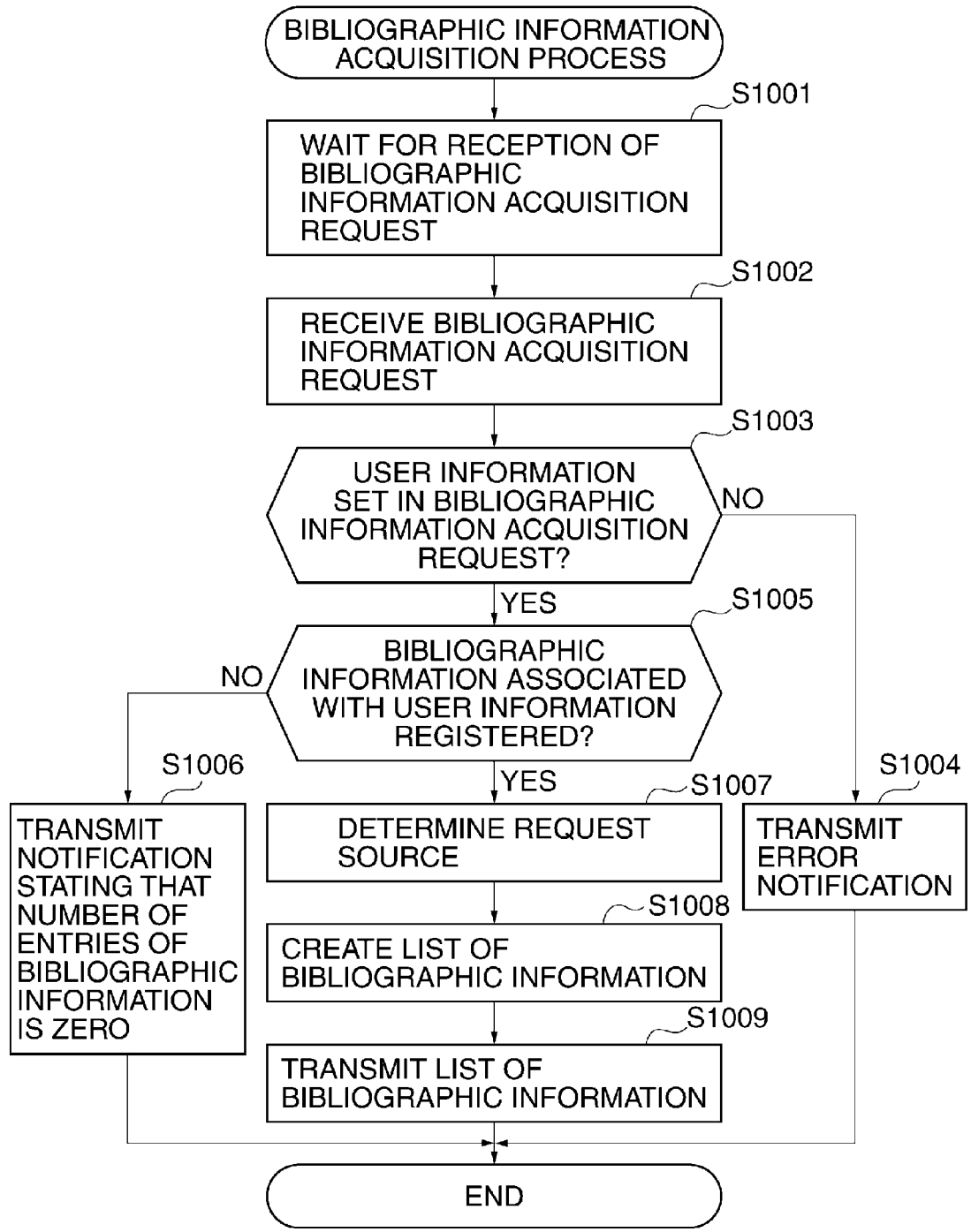
FIG. 12 is a flowchart showing procedures of a bibliographic information acquisition process executed by the image forming apparatus, which is the bibliographic server.

FIG. 12 shows in flowchart the procedures of a bibliographic information acquisition process executed by software modules running on the CPU 201 of the image forming apparatus 104, which is the bibliographic server.

At start of the bibliographic information acquisition process of FIG. 12, the bibliographic information management part 411 waits for reception of a bibliographic information acquisition request, which is shown in FIG. 10 (step S1001). Then, the management part 411 receives the bibliographic information acquisition request via the network interface 206 (step S1002), and determines whether user information is set in the received bibliographic information acquisition request (step S1003).

If user information is not set in the bibliographic information acquisition request (NO to step S1003), the management part 411 transmits an error notification to a request source image forming apparatus or to a request source printer (step S1004), and completes the present process. On the other hand, if user information is set in the bibliographic information acquisition request (YES to step S1003), the management part 411 determines whether bibliographic information associated with the user information set in the acquisition request has been registered in the bibliographic information management table 500 (step S1005).

If the bibliographic information associated with the user information has not been registered in the management table 500 (NO to step S1005), the bibliographic information management part 411 transmits a notification stating that the number of entries of bibliographic information registered in the management table 500 is zero to the request source via the network interface 206 (step S1006), and completes the present process.

On the other hand, if the bibliographic information associated with the user information has been registered in the management table 500 (YES to step S1005), the bibliographic information management part 411 determines the ability and construction of the request source image forming apparatus or of the request source printer based on the request source information contained in the bibliographic information acquisition request received from the request source (step S1007), and proceeds to step S1008.

In step S1008, the bibliographic information management part 411 creates a list of bibliographic information based on the ability and construction of the request source that are determined in step S1007. To this end, the management part 411 excludes, from among pieces of bibliographic information registered in the management table 500 and associated with user information contained in the bibliographic information acquisition request, pieces of bibliographic information each of which does not include construction information that represents the construction with which the to-be-printed data can be printed. For example, bibliographic information indicating that the color mode (see FIG. 5) is full color is excluded if the request source is a monochrome machine, and bibliographic information indicating punch finishing (see FIG. 5) is excluded if the request source is not provided with a punch finisher.

As described above, the bibliographic information management part 411 creates a list of bibliographic information by only selecting pieces of bibliographic information, each of which includes construction information that represents the construction with which the to-be-printed data can be printed, from among pieces of bibliographic information registered in the management table 500 and associated with user information contained in the bibliographic information acquisition request. It should be noted that if the request source has a construction not including an HDD, the bibliographic information management part 411 excludes print settings (see FIG. 5) from each bibliographic information to reduce the size of the to-be-transmitted list of bibliographic information.

Next, the bibliographic information management part 411 transmits the list of bibliographic information created in step S1008 to the request source (step S1009), and completes the present process. Step S1009 corresponds to a bibliographic information transmission unit of this invention that is configured, in a case where a bibliographic information acquisition request is received, to transmit bibliographic information corresponding to the received bibliographic information acquisition request, among pieces of bibliographic information registered in the registration unit, to an image forming apparatus that has transmitted the bibliographic information acquisition request.

Figure 13:
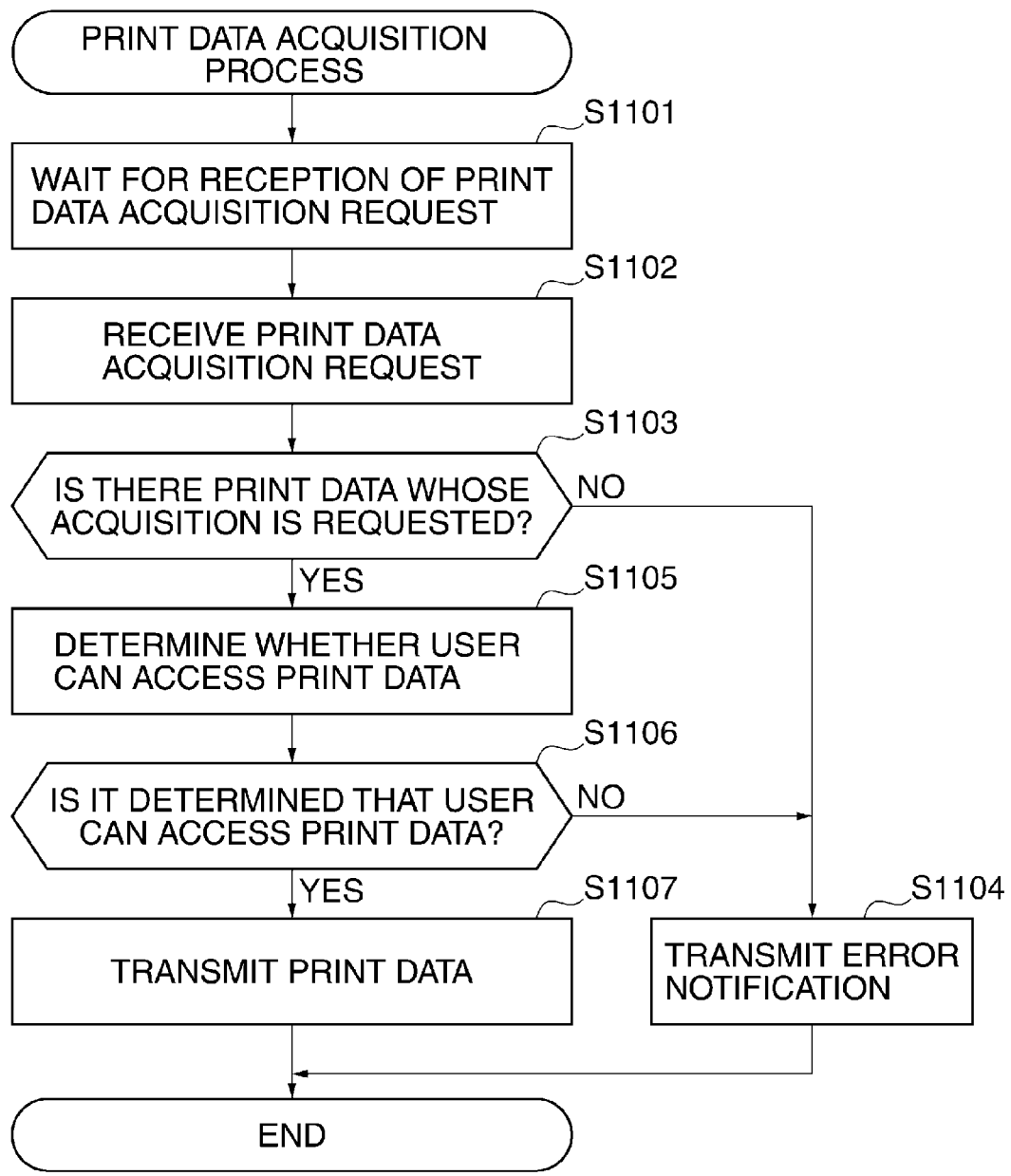
FIG. 13 is a flowchart showing procedures of a print data acquisition process executed by an image forming apparatus, which is the print data receiver.

FIG. 13 shows in flowchart the procedures of a print data acquisition process executed by software modules running on the CPU 201 of the image forming apparatus 103, which is the print data receiver.

At start of the print data acquisition process of FIG. 13, the retention print application 413 waits for reception of a print data acquisition request (step S1101), receives a print data acquisition request via the network interface 206 (step S1102), and determines whether there is print data whose acquisition is requested (step S1103).

If there is no print data whose acquisition is requested (NO to step S1103), the retention print application 413 transmits an error notification to the request source (step S1104), and completes the present process. On the other hand, if there is print data whose acquisition is requested (YES to step S1103), the flow proceeds to step S1105.

In step S1105, the retention print application 413 acquires user information from the print data acquisition request, and the access control part 410 determines whether the user indicated by the user information can access print data whose acquisition is requested. Next, the retention print application 413 determines whether the access control part 410 has determined that the user can access the print data (step S1106).

If the access control part 410 has determined that the user cannot access the print data (NO to step S1106), the flow proceeds to step S1104, which is described above. On the other hand, if the access control part 410 has determined that the user can access the print data (YES to step S1106), the retention print application 413 transmits to the request source the print data whose acquisition is requested (step S1107), and completes the present process.

Figure 14:
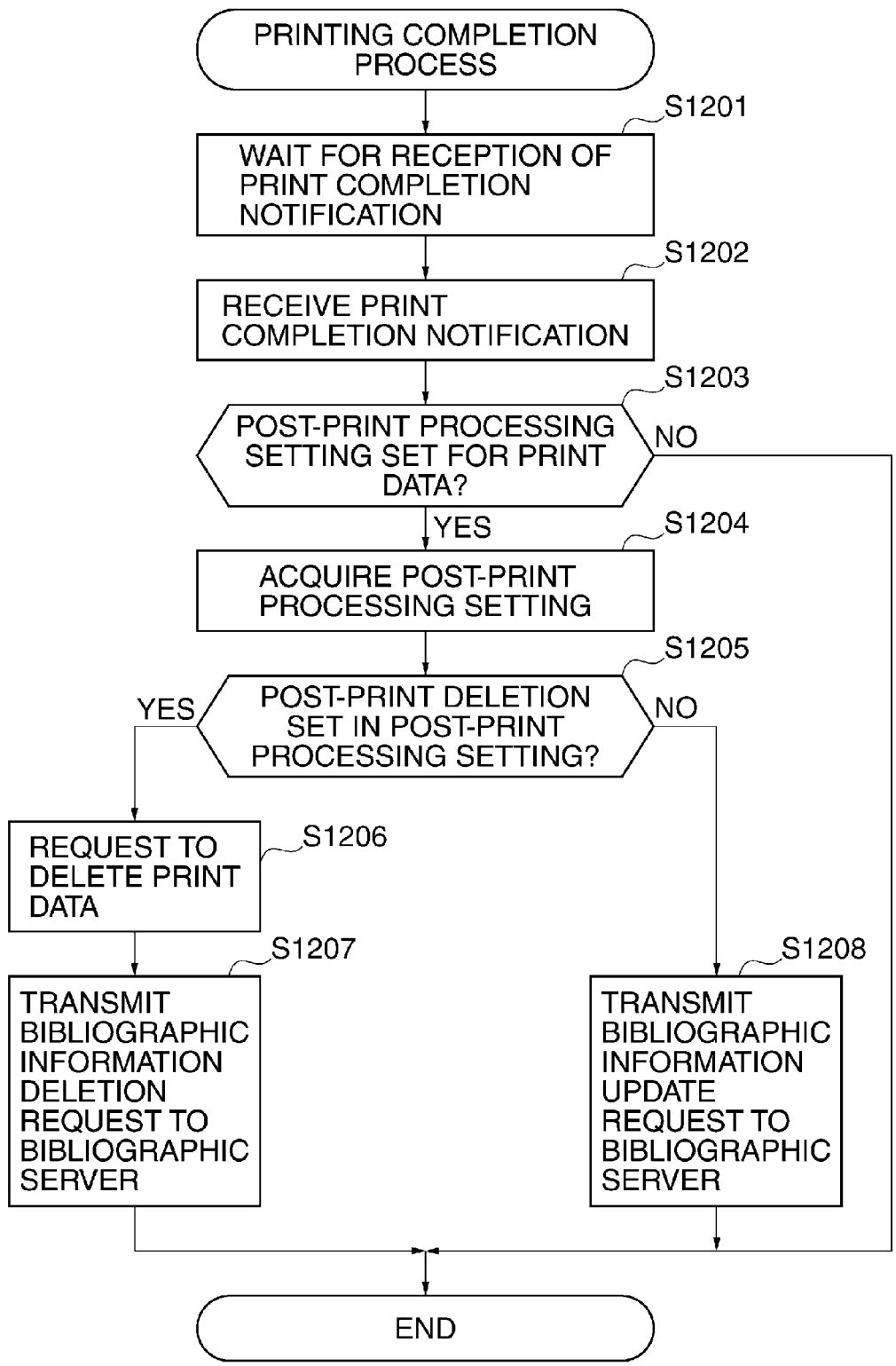
FIG. 14 is a flowchart showing procedures of a printing completion process executed by the image forming apparatus, which is the print data receiver.

FIG. 14 shows in flowchart the procedures of a printing completion process executed by software modules running on the CPU 201 of the image forming apparatus 103, which is the print data receiver.

At start of the printing completion process of FIG. 14, the retention print application 413 waits for reception of a print completion notification (step S1201), receives a print completion notification via the network interface 206 (step S1202), and determines based on the print completion notification whether a post-print processing setting is set for the printed print data (step S1203). If no post-print processing setting is set (NO to step S1203), the present process is completed.

If a post-print processing setting is set (YES to step S1203), the retention print application 413 acquires the post-print processing setting (step S1204), and determines whether post-print deletion is set in the post-print processing setting (step S1205). If post-print deletion is set (YES to step S1205), the retention print application 413 requests the file system 403 to delete the printed print data (step S1206), transmits a bibliographic information deletion request to the image forming apparatus 104 (step S1207), and completes the present process.

If post-print deletion is not set (NO to step S1205), the retention print application 413 transmits to the bibliographic server a bibliographic information update request for update of the print completion flag 512 (step S1208), and completes the present process.

As described above, according to this embodiment, it is possible to realize the retention printing system in which pieces of bibliographic information each identifying print data can be managed by the image forming apparatus with management function (bibliographic server).

With this retention printing system, an image forming apparatus that cannot print to-be-printed data by itself can acquire the to-be-printed data from any of external image forming apparatuses, without making inquiries about the presence or absence of the to-be-printed data to all the external image forming apparatuses. Thus, unnecessary connections to external image forming apparatuses not stored with the to-be-printed data are not caused. In addition, since a list of bibliographic information is created by the bibliographic server according to the ability and construction of the bibliographic information request source, unnecessary bibliographic information transmission to the request source can be suppressed.

FIG. 15 shows an example of use history information stored in the HDD 204 of the image forming apparatus 105 or of the printer 106 (each of which is the printing apparatus) and indicating a use history of the printing apparatus.

As shown in FIG. 15, the use history information has fields of user name, IP address, number of times of acquisition, and last acquisition date and time.

The "user name" fields are each stored with a name of a user who gave a print instruction, the "IP address" fields are each stored with an IP address of an acquisition destination of print data (hereinafter, referred to as the print data acquisition destination or the acquisition destination), the "number of times of acquisition" fields are each stored with the number of times of acquisition of print data from the acquisition destination, and the "last acquisition date and time" fields are each stored with last acquisition date and time of print data from the acquisition destination.

The "user name" fields are created for respective print data acquisition destinations. In the illustrated example, two user name fields stored with the same user name "Yamada" are provided to respectively correspond to two print data acquisition destinations (more specifically, the IP address fields of these acquisition destinations).

The use history information is updated when it is determined in step S907 of the printing process of FIG. 11 that printing has succeeded. Therefore, it becomes possible to determine a print data acquisition destination that has a high possibility of being used by the user to acquire to-be-printed data.

As understood from the above description, the use history information indicates, on a per user basis, identification information that identifies an acquisition destination of to-be-printed data, the number of times of acquisition of print data from the acquisition destination, and the last acquisition date and time of print data from the acquisition destination.

Figure 16:
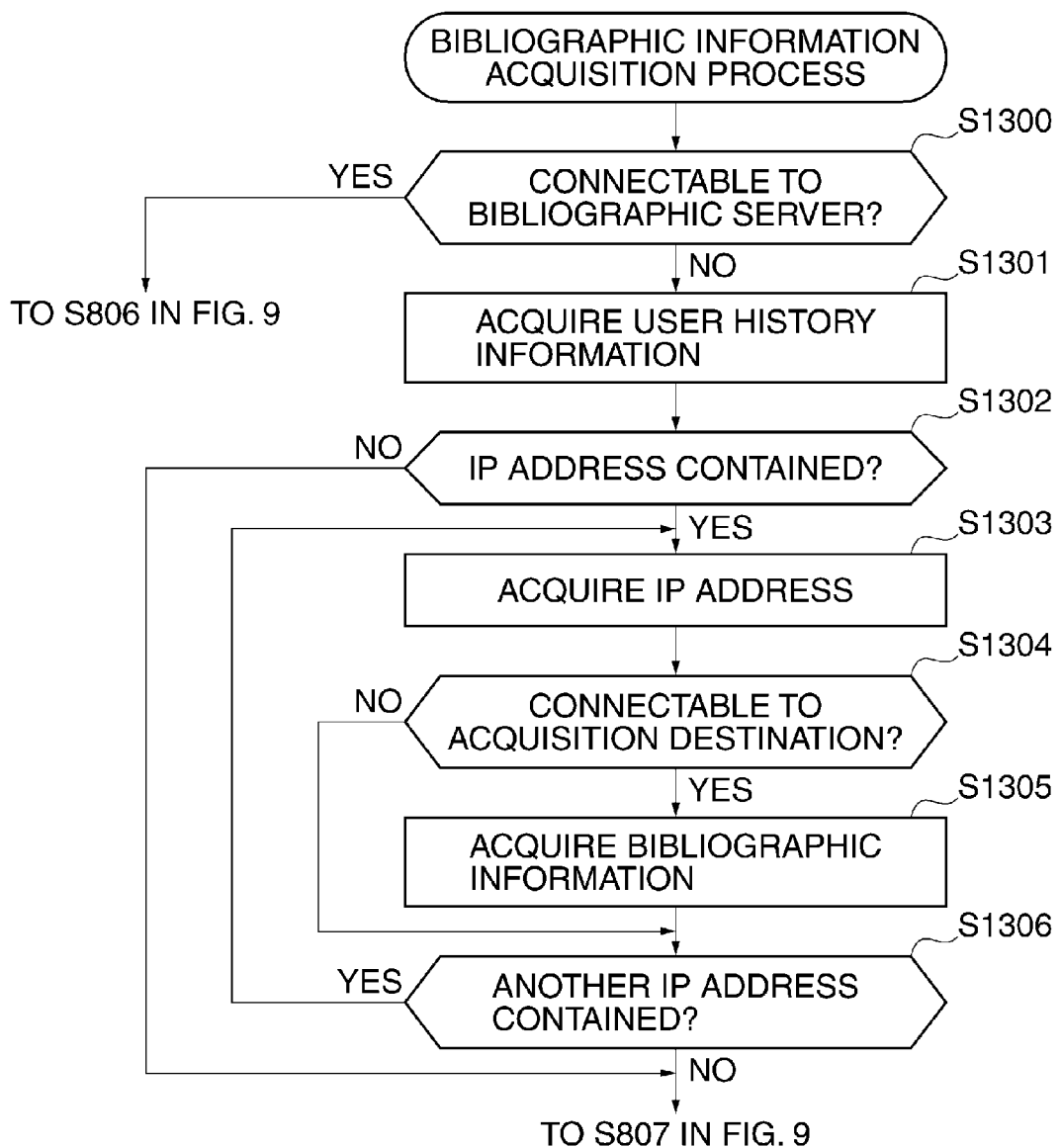
FIG. 16 is a flowchart showing procedures of a first example of a bibliographic information acquisition process, which is added to the printing overall process of FIG. 9 and executed by using use history information.

FIG. 16 shows in flowchart the procedures of a first example of a bibliographic information acquisition process, which is added to the printing overall process of FIG. 9 and performed based on the use history information. This bibliographic information acquisition process is executed by the CPU 201 of the image forming apparatus 105 which is the printing apparatus, and is started when the answer to step S805 of FIG. 9 becomes YES.

At start of the bibliographic information acquisition process of FIG. 16, the CPU 201 determines whether the image forming apparatus 105 (printing apparatus) can be connected to the image forming apparatus 104 which is the bibliographic server (step S1300). If connection to the image forming apparatus 104 can be made (YES to step S1300), the flow proceeds to step S806 of FIG. 9.

If connection to the image forming apparatus 104 cannot be made (NO to step S1300), the CPU 201 acquires the use history information (see FIG. 15) stored in the image forming apparatus 105 (step S1301), and determines whether the IP address of at least one print data acquisition destination is contained in the acquired use history information (step S1302). If no IP address is contained (NO to step S1302), the flow proceeds to step S807 of FIG. 9.

If the IP address of at least one acquisition destination is contained in the use history information (YES to step S1302), the CPU 201 acquires the IP address of a first one of the at least one acquisition destination from the use history information (step S1303), and determines whether connection to the acquisition destination can be made using the acquired IP address (step S1304). If connection to the acquisition destination cannot be made (NO to step S1304), the flow proceeds to step S1306.

If connection to the acquisition destination can be made (YES to step S1304), the CPU 201 causes the image forming apparatus 105 to connect to the acquisition destination and acquires bibliographic information therefrom (step S1305). Next, the CPU 201 determines whether the IP address of another acquisition destination is contained in the use history information (step S1306).

If no such IP address is contained in the use history information (NO to step S1306), the flow proceeds to step S807 of FIG. 9. If the IP address of another acquisition destination is contained in the use history information (YES to step S1306), the flow returns to step S1303.

Figure 17:
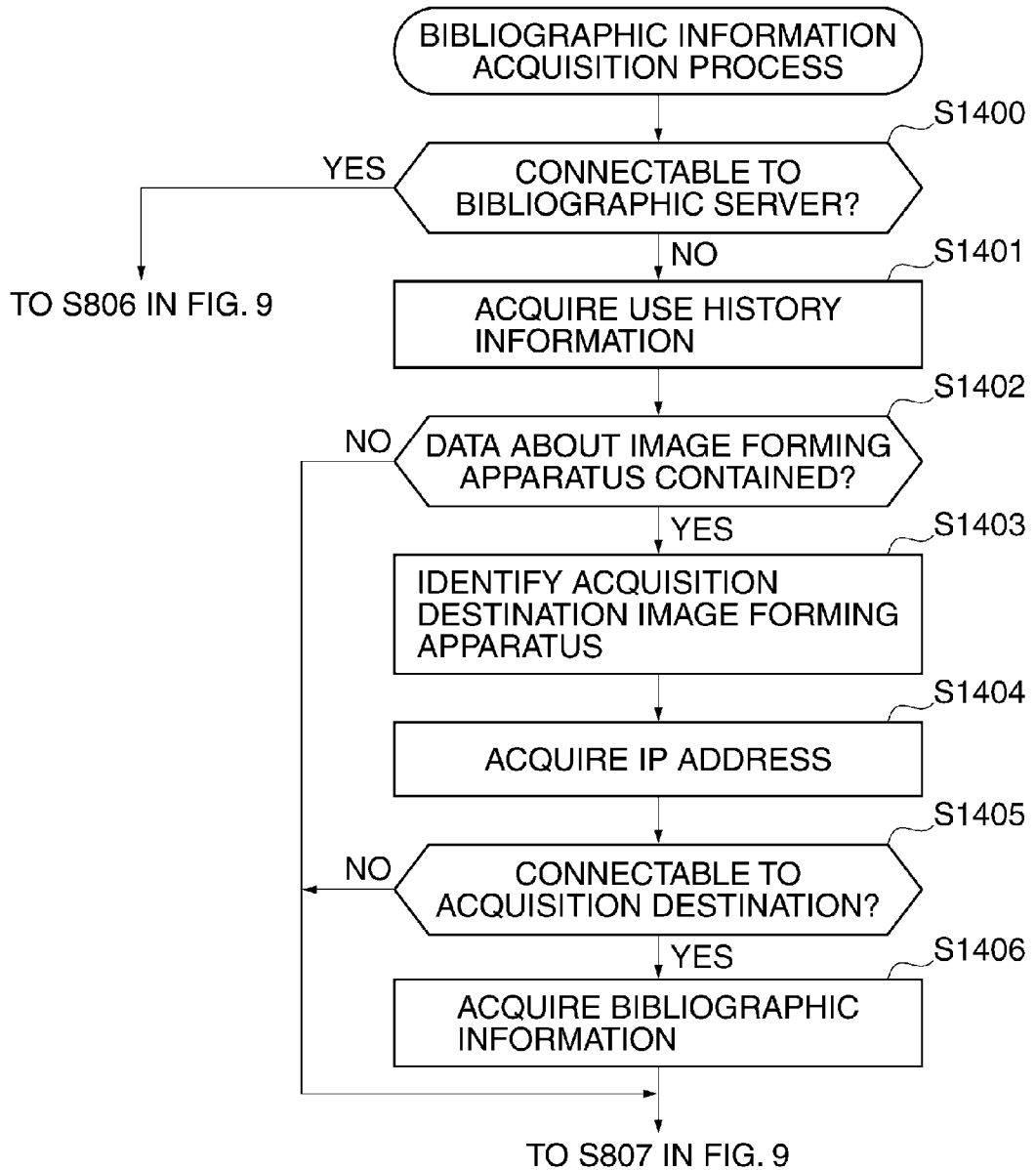
FIG. 17 is a flowchart showing procedures of a second example of the bibliographic information acquisition process.

FIG. 17 shows in flowchart the procedures of a second example of a bibliographic information acquisition process, which is added to the printing overall process of FIG. 9 and performed based on the use history information. As with the bibliographic information acquisition process of FIG. 16, this bibliographic information acquisition process is executed by the CPU 201 of the image forming apparatus 105 (printing apparatus) and started when the answer to step S805 of FIG. 9 becomes YES.

At start of the bibliographic information acquisition process of FIG. 17, the CPU 201 determines whether the image forming apparatus 105 (printing apparatus) can be connected to the image forming apparatus 104 which is the bibliographic server (step S1400). If connection to the image forming apparatus 104 can be made (YES to step S1400), the flow proceeds to step S806 of FIG. 9.

If connection to the image forming apparatus 104 cannot be made (NO to step S1400), the CPU 201 acquires the use history information stored in the image forming apparatus 105 (step S1401), and determines whether data about the image forming apparatus (the number of times of acquisition or the last acquisition date and time from at least one acquisition destination in this example) is contained in the acquired history information (step S1402). If data about the image forming apparatus is not contained in the use history information (NO to step S1402), the flow proceeds to step S807 of FIG. 9.

If data about the image forming apparatus is contained in the use history information (YES to step S1402), the CPU 201 determines the greatest one among the at least one number of times of acquisition or the newest one among the at least one last acquisition date and time, thereby identifying the acquisition destination image forming apparatus (step S1403).

Next, the CPU 201 acquires the IP address (192.168.1.1 or 192.168.3.1 in the example of FIG. 15) of the identified acquisition destination from the use history information (step S1404), and determines whether connection to the acquisition destination image forming apparatus can be made using the acquired IP address (step S1405).

If connection to the acquisition destination image forming apparatus cannot be made (NO to step S1405), the flow proceeds to step S807 of FIG. 9. On the other hand, if connection to the acquisition destination image forming apparatus can be made (YES to step S1405), the CPU 201 causes the image forming apparatus 105 to connect to the acquisition destination image forming apparatus and to acquire bibliographic information from the acquisition destination (step S1406), and proceeds to step S807 of FIG. 9.

Figure 18:
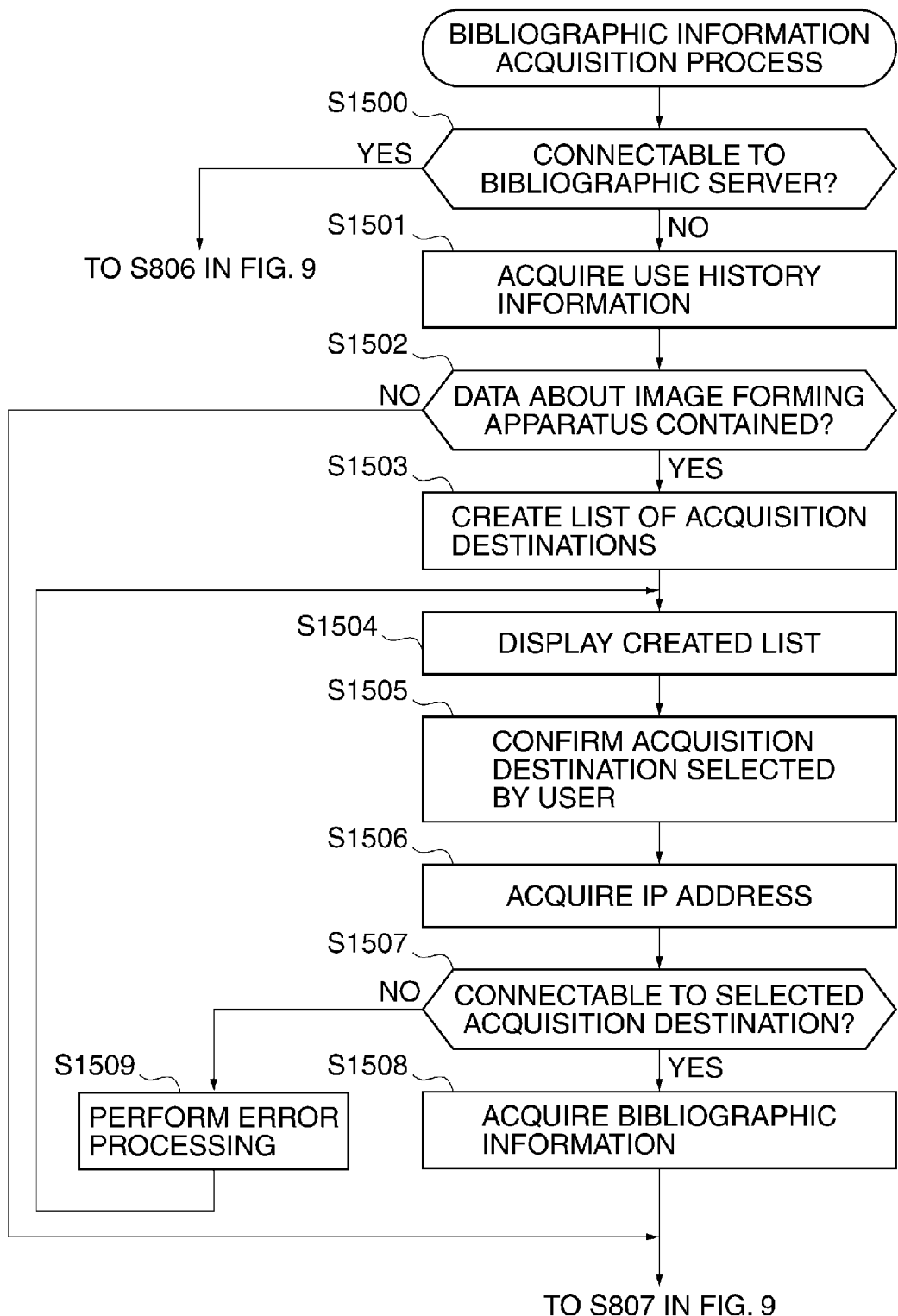
FIG. 18 is a flowchart showing procedures of a third example of the bibliographic information acquisition process.

FIG. 18 shows in flowchart the procedures of a third example of a bibliographic information acquisition process, which is added to the printing overall process of FIG. 9 and performed based on the use history information.

As with the bibliographic information acquisition processes of FIGS. 16 and 17, this bibliographic information acquisition process is executed by the CPU 201 of the image forming apparatus 105 (printing apparatus) and started when the answer to step S805 of FIG. 9 becomes YES. It should be noted that unlike the history information shown in FIG. 15, the use history information used in this bibliographic information acquisition process has acquisition destination name fields each stored with a print data acquisition destination name (e.g., an image forming apparatus name).

At start of the bibliographic information acquisition process of FIG. 18, the CPU 201 determines whether the image forming apparatus 105 (printing apparatus) can be connected to the image forming apparatus 104 which is the bibliographic server (step S1500). If connection to the image forming apparatus 104 can be made (YES to step S1500), the flow proceeds to step S806 of FIG. 9.

If connection to the image forming apparatus 104 cannot be made (NO to step S1500), the CPU 201 acquires the use history information stored in the image forming apparatus 105 (step S1501), and determines whether data about the image forming apparatus (the name of at least one acquisition destination in this example) is contained in the acquired use history information (step S1502). If data about the image forming apparatus is not contained in the use history information (NO to step S1502), the flow proceeds to step S807 of FIG. 9.

If data about the image forming apparatus is contained in the use history information (YES to step S1502), the CPU 201 creates a list of bibliographic information acquisition destinations based on the name of at least one acquisition destination contained in the use history information (step S1503), and causes the operation unit 210 to display the created list (step S1504).

Figure 19:
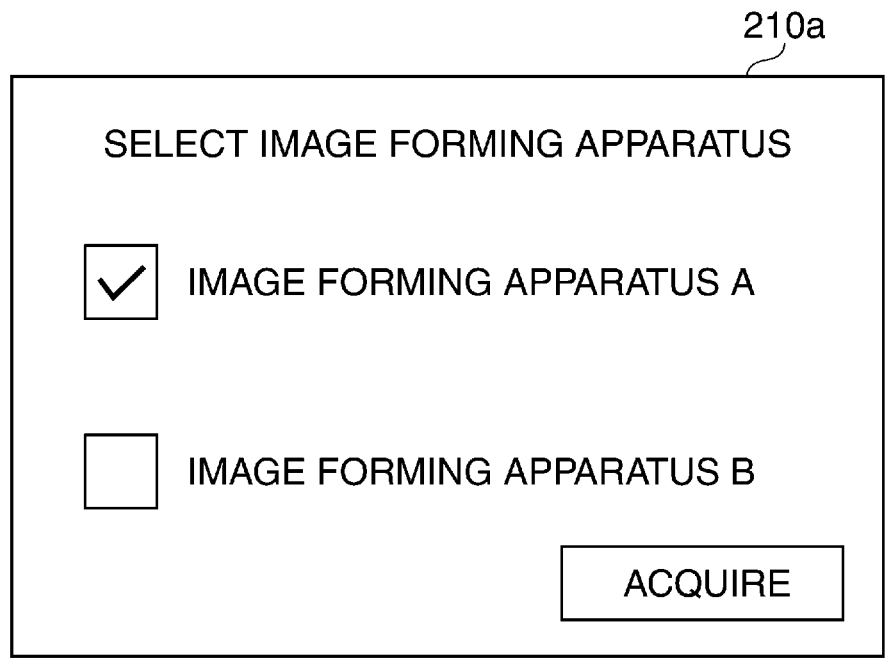
FIG. 19 is a view showing an example of an acquisition destination list display screen displayed on an operation unit of the image forming apparatus of FIG. 3.

FIG. 19 shows an example of an acquisition destination list display screen displayed on the operation unit 210. In the illustrated example, a list of bibliographic information acquisition destinations that includes names of bibliographic information acquisition destinations (e.g., image forming apparatus A and image forming apparatus B), checkboxes respectively corresponding to the acquisition destination names, and an acquire button are displayed on the display screen 210a. The user can select any of the acquisition destinations by checking any of the checkboxes and by pressing the acquire button.

Referring to FIG. 18 again, the CPU 201 confirms the bibliographic information acquisition destination selected by the user on the display screen 210a of FIG. 19 (step S1505), acquires the IP address of the selected acquisition destination (step S1506), and determines whether connection to the selected acquisition destination can be made using the acquired IP address (step S1507).

If connection to the acquisition destination cannot be made (NO to step S1507), the CPU 201 performs error processing such as displaying on the operation unit 210 a message stating that connection to the selected acquisition destination cannot be made (step S1509), and returns to step S1504. If connection to the acquisition destination can be made (YES to step S1507), the CPU 201 causes the image forming apparatus 105 to connect to the acquisition destination to acquire bibliographic information therefrom (step S1508), and proceeds to step S807 of FIG. 9.

According to the bibliographic information acquisition processes shown in FIGS. 16-18, in a case where the image forming apparatus (bibliographic server) cannot be connected to the image forming apparatus with management function (bibliographic server), it is possible to acquire bibliographic information from the image forming apparatus identified by identification information indicated in the use history information of the image forming apparatus (printing apparatus), or from the image forming apparatus which is the largest in the number of times of acquisition indicated in the use history information, or from the image forming apparatus which is the newest in last acquisition date indicated in the use history information, or from the image forming apparatus selected by the user from among the image forming apparatuses identified by identification information indicated in the use history information. Thus, bibliographic information can be acquired from the acquisition destination which is high in possibility of being used for bibliographic information acquisition or from the acquisition destination which is selected by the user.

In the printing process shown in FIGS. 9 and 11, the image forming apparatus stored with to-be-printed data is identified based on the bibliographic information acquired in the bibliographic information acquisition process, and the to-be-printed data acquired from the identified image forming apparatus can efficiently be printed.

Figure 20:
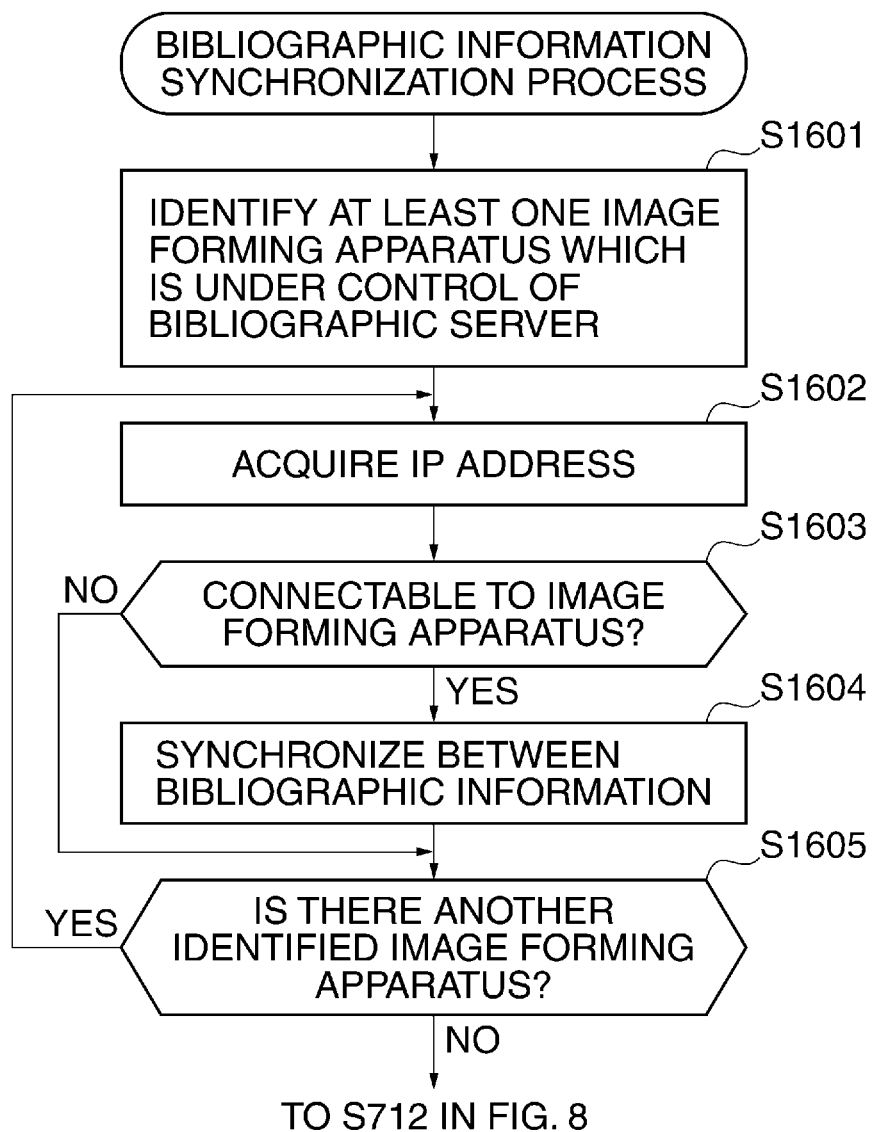
FIG. 20 is a flowchart showing procedures of a bibliographic information synchronization process which is added to the bibliographic information management process of FIG. 8 and which is executed based on the use history information.

FIG. 20 shows in flowchart the procedures of a bibliographic information synchronization process which is added to the bibliographic information management process of FIG. 8 and which is executed based on the use history information.

The bibliographic information synchronization process is executed by the CPU 201 of the image forming apparatus 104 between the steps S707 and S712 of FIG. 8 in order to synchronize between bibliographic information managed by the image forming apparatus 104 with management function (bibliographic server) and bibliographic information stored in another image forming apparatus.

At start of the bibliographic information synchronization process of FIG. 20, the CPU 201 of the image forming apparatus 104 identifies, based on the bibliographic information of the request source extracted from the bibliographic information management request and then stored into the management table 500 in steps S702 to S707 of FIG. 8, at least one image forming apparatus (the image forming apparatus 105 and the printer 106 in this example) in which the image forming apparatus 104 has been registered as the bibliographic server and which is under control of the image forming apparatus 104 (step S1601).

Next, the CPU 201 of the image forming apparatus 104 acquires, in step S1602, the IP address of a first one (the image forming apparatus 105 in this example) of the at least one image forming apparatus identified in step S1601, and determines, in step S1603, whether the image forming apparatus 104 can be connected to the image forming apparatus 105 by using the IP address acquired in step S1602. If the image forming apparatus 104 cannot be connected to the image forming apparatus 105 (NO to step S1603), the flow proceeds to step S1605.

If the image forming apparatus 104 can be connected to the image forming apparatus 105 (YES to step S1603), the CPU 201 of the image forming apparatus 104 causes the image forming apparatus 104 to connect to the image forming apparatus 105. Next, the CPU 201 synchronizes bibliographic information managed by the image forming apparatus 104 with bibliographic information stored in the image forming apparatus 105, and transmits all the bibliographic information managed by the image forming apparatus 104 to the image forming apparatus 105 (step S1604).

In the image forming apparatus 105, cache data (bibliographic information) previously stored in the HDD 204 of the image forming apparatus 105 is replaced by the latest bibliographic information transmitted from the image forming apparatus 104 or a difference between the previously stored cache data and the latest bibliographic information is updated, for example. As a result, the cache data (bibliographic information) stored in the HDD 204 of the image forming apparatus 105 and the bibliographic information registered in the image forming apparatus 104 are synchronized to be consistent with each other.

Next, the CPU 201 determines, in step S1605, whether there is another image forming apparatus that has been identified in step S1601. If there is no another identified image forming apparatus (NO to step S1605), the flow proceeds to step S712 of FIG. 8. On the other hand, if there is another identified image forming apparatus (YES to step S1605), the flow returns to step S1602 where processing is executed, as with the case of the image forming apparatus 105, to synchronize cache data stored in the other image forming apparatus (the printer 106 in this example) and bibliographic information registered in the image forming apparatus 104 with each other.

According to the bibliographic information synchronization process of FIG. 20, bibliographic information consistent with bibliographic information managed by the bibliographic server can be stored in the form of cache data in the HDD 204 of the printing apparatus, and the printing apparatus can acquire such cache data from the HDD 204, where necessary.

Figure 21:
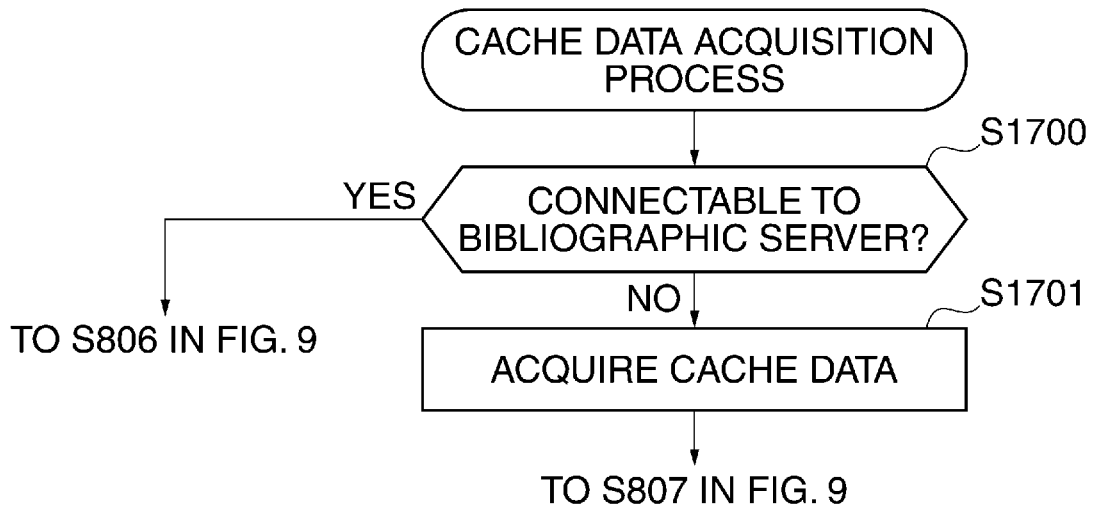
FIG. 21 is a flowchart showing procedures of a cache data acquisition process which is added to the printing overall process of FIG. 9 and which is executed to acquire, from the printing apparatus, cache data consistent with bibliographic information registered in the bibliographic server.

FIG. 21 shows in flowchart the procedures of a cache data acquisition process, which is added to the printing overall process of FIG. 9. This cache data acquisition process is executed by the CPU 201 of the image forming apparatus 105 to acquire cache data consistent with bibliographic information registered in the bibliographic server from the image forming apparatus 105 (printing apparatus), and is started when the answer to step S805 of FIG. 9 becomes affirmative.

At start of the cache data acquisition process of FIG. 21, the CPU 201 of the image forming apparatus 105 determines whether the image forming apparatus 105 can be connected to the image forming apparatus 104 which is the bibliographic server (step S1700).

If the image forming apparatus 105 can be connected to the image forming apparatus 104 (YES to step S1700), the flow proceeds to step S806 of FIG. 9. In step S806, a bibliographic information acquisition request is transmitted to the image forming apparatus 104. On the other hand, if the image forming apparatus 105 cannot be connected to the image forming apparatus 104 (NO to step S1700), the CPU 201 of the image forming apparatus 105 acquires cache data (bibliographic information), which is stored in the HDD 204 of the image forming apparatus 105 in a process similar to the bibliographic information synchronization process of FIG. 20 executed by the CPU 201 of the image forming apparatus 104 (step S1701), and proceeds to step S807 of FIG. 9. In step S807, whether or not bibliographic information acquisition has succeeded is determined.

As described above, according to the cache data acquisition process of FIG. 21, in a case where the printing apparatus cannot be connected to the image forming apparatus with management function, it is possible to acquire cache data (bibliographic information) consistent with bibliographic information registered in the image forming apparatus with management function from the HDD 204 of the printing apparatus.

In the following, a description will be given of a public setting set to the image forming apparatus 103, which is the print data receiver.

The public setting refers to a setting that indicates whether print data received from the personal computer 102 by the image forming apparatus 103 and stored therein is to be opened to other image forming apparatuses.

In a case where print data stored in the image forming apparatus 103 is not to be opened to other image forming apparatuses, i.e., in a case where the public setting is OFF, bibliographic information of the print data received by and stored in the image forming apparatus 103 is not registered into the image forming apparatus 104 (bibliographic server). Thus, the print data stored in the image forming apparatus 103 can be printed by the image forming apparatus 103, but cannot be printed by other image forming apparatuses.

It should be noted that in a case where the public setting is OFF and print data received by the image forming apparatus 103 is designated to be retained, RIP processing is performed on the print data and the RIP-processed print data is stored in advance in the image forming apparatus 103, whereby the print data can be printed quickly.

On the other hand, in a case where the print data stored in the image forming apparatus 103 is to be opened to other image forming apparatuses, i.e., in a case where the public setting is ON, bibliographic information of the print data received by and stored in the image forming apparatus 103 is registered into the image forming apparatus 104 (bibliographic server). Thus, the print data stored in the image forming apparatus 103 can be printed not only by the image forming apparatus 103 but also by other image forming apparatuses. However, in a case where the public setting is ON, the print data is stored into the image forming apparatus 103 without being RIP-processed. This is because RIP-processed print data has a setting peculiar to the image forming apparatus used for the RIP processing, and therefore, printing quality can be lowered or printing errors can be caused when the RIP-processed print data is printed by another image forming apparatus.

In general, the setting of the public setting to the image forming apparatus 103 and a change thereof are performed by an administrator, and general users cannot set and change the public setting. However, this is not limitative in this invention. It should be noted that the public setting can be automatically made OFF in a case where communication cannot be performed between the image forming apparatus 103 and other image forming apparatuses for the reason, for example, that the IP address of the image forming apparatus 103 is not set.

Figure 22A:
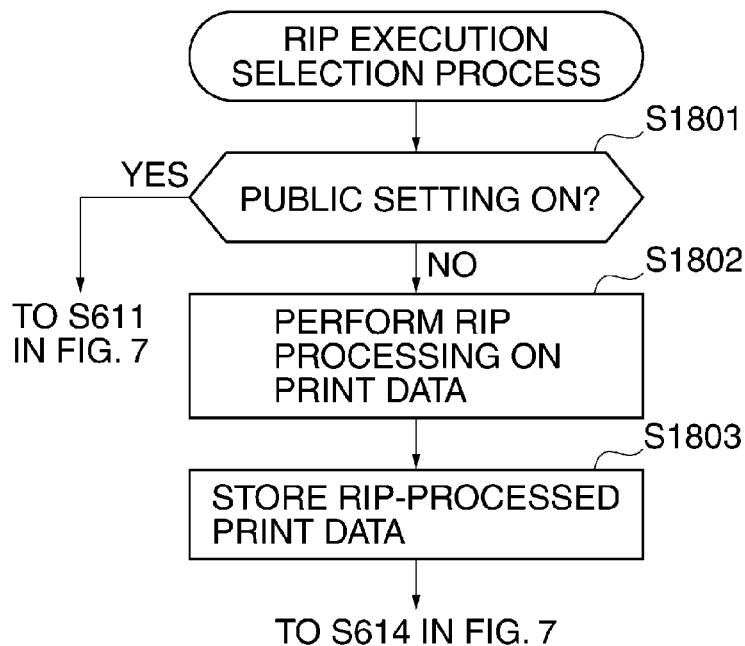
FIG. 22A is a flowchart showing procedures of an RIP execution selection process which is added to the print data reception process of FIG. 7.

FIG. 22A shows in flowchart the procedures of an RIP execution selection process, which is added to the print data reception process of FIG. 7. This RIP execution selection process is executed by the CPU 201 of the image forming apparatus 103 (print data receiver) to selectively perform the RIP processing according to ON/OFF of the public setting, and is started when the answer to step S609 of FIG. 7 becomes affirmative.

At start of the RIP execution selection process of FIG. 22A, the CPU 201 determines whether the public setting is ON (step S1801). If the public setting is ON (YES to step S1801), the flow proceeds to step S611. In this case, print data is stored into the HDD 204 of the image forming apparatus 103 without being RIP-processed.

If the public setting is OFF (NO to step S1801), the CPU 201 performs RIP processing on PDL data contained in the print data according to print settings (step S1802), causes the file system 403 to store the print data into the HDD 204 (step S1803), and proceeds to step S614 of FIG. 7.

As described above, according to the RIP execution selection process of FIG. 22A, in a case where the public setting is OFF, i.e., in a case where bibliographic information of print data received by the image forming apparatus 103 is not registered in the image forming apparatus 104 with management function, PDL data contained in the received print data is RIP processed and the RIP-processed print data is stored into the HDD 204.

Figure 22B:
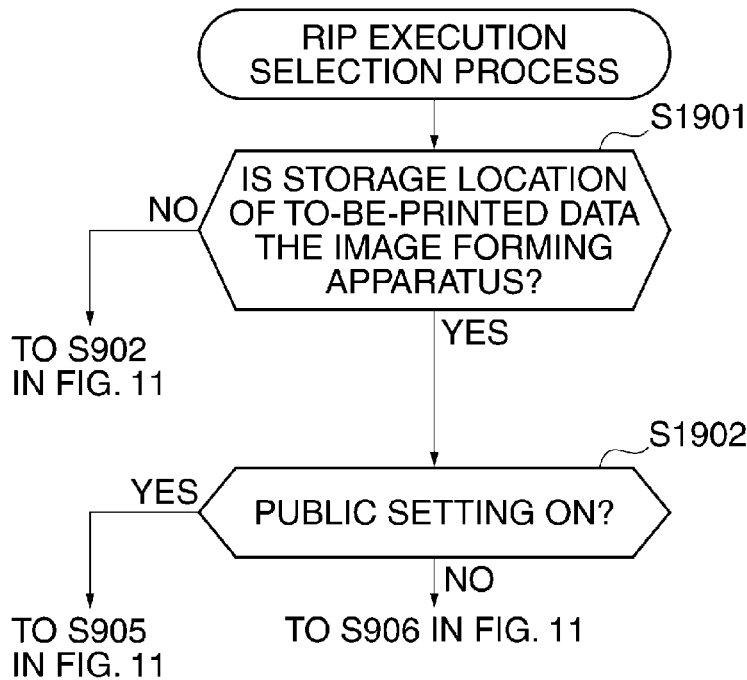
FIG. 22B is a flowchart showing procedures of an RIP execution selection process added to the printing process of FIG. 11.

FIG. 22B shows in flowchart the procedures of an RIP execution selection process added to the printing process of FIG. 11. This RIP execution selection process is executed by the CPU 201 of the image forming apparatus 105 (printing apparatus) between step S901 and step S902, S905, or S906 in FIG. 11 to selectively perform the RIP processing according to ON/OFF of the public setting.

At start of the RIP execution selection process of FIG. 22B, the CPU 201 of the image forming apparatus 105 determines, based on bibliographic information contained in a print request received by the image forming apparatus 105, whether a storage location of to-be-printed data identified in step S901 of FIG. 11 is the image forming apparatus 105 (step S1901).

If the storage location of the to-be-printed data is not the image forming apparatus 105 (NO to step S1901), the flow proceeds to step S902 of FIG. 11 in which it is determined whether connection to a print data receiver can be made. On the other hand, if the storage location of the to-be-printed data is the image forming apparatus 105 (YES to step S1901), the CPU 201 determines whether the public setting is ON (step S1902).

If the public setting is ON (YES to step S1902), the flow proceeds to step S905 in which RIP processing is performed on PDL data contained in the to-be-printed data according to print settings.

On the other hand, if the public setting is OFF, i.e., if the to-be-printed data has already been RIP-processed (NO to step S1902), the flow proceeds to step S906 of FIG. 11 in which a print instruction is given to the printer unit 209, and the to-be-printed data that has already been RIP-processed is quickly printed by the printer unit 209 in response to the print instruction.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-016865, filed Jan. 31, 2013, which is hereby incorporated by reference herein in its entirety.

What is claimed is:

1. An image forming system comprising:
a first image forming device;
a second image forming device; and
a third image forming device,
wherein said first image forming device is configured to:
    store data transmitted from an external device;
    register, in said first image forming device, a print attribute of the data and address information of the data as bibliographic information and transmit, to said second image forming device, a registration request for registering the bibliographic information;
    in a case where a user logs in to said first image forming device, obtain the bibliographic information registered in said first image forming device;
    display a list of the bibliographic information;
    obtain the data, which is stored in said first image forming device, based on the address information included in the bibliographic information selected by the user from the list; and
    print the data obtained from said first image forming device,
said second image forming device is configured to register the same bibliographic information registered in said first image forming device in accordance with the registration request from said first image forming device, and
said third image forming device is configured to:
    in a case where the user logs in to the third image forming device, obtain the bibliographic information, which is registered in said second image forming device, from said second image forming device;
    display a list of the bibliographic information obtained from said second image forming device;
    determine said first image forming device to be a device from which to obtain the data, based on the address information included in the bibliographic information selected by the user from the list displayed;
    obtain the data from said first image forming device; and
    print the data obtained from said first image forming device.

2. The image forming system according to claim 1, wherein the address information includes an IP address or a host name of the first image forming device.

3. The image forming system according to claim 1, wherein the print attribute includes setting items of a color mode, a sheet size, a number of sets, a finishing, and a double-sided setting.

4. The image forming system according to claim 1, wherein the print attribute registered in said second image forming device and a print attribute stored in said first image forming device are synchronized to be consistent with each other.

5. The image forming system according to claim 1, wherein said second image forming device is configured to register a storage location of the data in said first image forming device, and
wherein said transmission unit is configured to transmit information that indicates the storage location of the data.

6. The image forming system according to claim 1, wherein the data contains PDL data.

7. The image forming system according to claim 1, wherein said second image forming device transmits the bibliographic information including the address information of said first image forming device to the third image forming device.

8. A method of obtaining print data using an image forming system comprising a first image forming device, a second image forming device, and a third image forming device, the method comprising:
    storing, by said first image forming device, data transmitted from an external device;
    registering, in said first image forming device, a print attribute of the data and address information of the data as bibliographic information and transmitting, by said first image forming device to said second image forming device, a registration request for registering the bibliographic information;
    obtaining, obtaining, by said first image forming device and in a case where a user logs in to said first image forming device, the bibliographic information registered in said first image forming device;
    displaying, by said first image forming device, a list of the bibliographic information;
    obtaining, by said first image forming device, the data, which is stored in said first image forming device, based on the address information included in the bibliographic information selected by the user from the list; and
    printing, by said first image forming device, the data obtained from said first image forming device,
    registering, by said second image forming device, the same bibliographic information registered in said first image forming device in accordance with the registration request from said first image forming device;
    obtaining, by said third image forming device and in a case where the user logs in to the third image forming device, the bibliographic information, which is registered in said second image forming device, from said second image forming device;
    displaying, by said third image forming device, a list of the bibliographic information obtained from said second image forming device;
    determining, by said third image forming device, said first image forming device to be a device from which to obtain the data, based on the address information included in the bibliographic information selected by the user from the list displayed;
    obtaining, by said third image forming device, the data from said first image forming device; and
    printing, by said third image forming device, the data obtained from said first image forming device.

* * * * *